United States Patent
Dohrn

(10) Patent No.: US 11,481,859 B2
(45) Date of Patent: Oct. 25, 2022

(54) METHODS AND SYSTEMS FOR SCHEDULING A USER TRANSPORT

(71) Applicant: LogiFlow Services, LLC, Davenport, IA (US)

(72) Inventor: Joseph Charles Dohrn, Woodland Park, CO (US)

(73) Assignee: LogiFlow Services, LLC, Davenport, IA (US)

(*) Notice: Subject to any disclaimer, the term of this patent is extended or adjusted under 35 U.S.C. 154(b) by 0 days.

(21) Appl. No.: 17/072,743

(22) Filed: Oct. 16, 2020

(65) Prior Publication Data

US 2022/0122211 A1   Apr. 21, 2022

(51) Int. Cl.

| | |
|---|---|
| G06F 16/22 | (2019.01) |
| G06Q 50/28 | (2012.01) |
| G06Q 10/06 | (2012.01) |
| G06Q 10/10 | (2012.01) |
| G06Q 10/08 | (2012.01) |
| G06F 16/955 | (2019.01) |
| G06F 16/93 | (2019.01) |
| G06F 40/30 | (2020.01) |
| G06F 3/04842 | (2022.01) |
| G06F 3/0481 | (2022.01) |

(52) U.S. Cl.
CPC ............ *G06Q 50/28* (2013.01); *G06F 16/22* (2019.01); *G06F 16/93* (2019.01); *G06F 16/955* (2019.01); *G06F 40/30* (2020.01); *G06Q 10/06315* (2013.01); *G06Q 10/083* (2013.01); *G06Q 10/1093* (2013.01); *G06F 3/0481* (2013.01); *G06F 3/04842* (2013.01)

(58) Field of Classification Search
CPC ............ G06Q 50/28; G06Q 10/06315; G06Q 10/083; G06Q 10/1093; G06F 16/22; G06F 16/93; G06F 16/955; G06F 40/30; G06F 3/0481; G06F 3/04842
USPC ....................................................... 707/736
See application file for complete search history.

(56) References Cited

U.S. PATENT DOCUMENTS

| | | | |
|---|---|---|---|
| 7,426,478 B2 | 9/2008 | Grosvenor et al. | |
| 7,457,761 B2 | 11/2008 | Smith et al. | |
| 7,546,520 B2 | 6/2009 | Davidson et al. | |
| 7,693,964 B2 | 4/2010 | Hancock et al. | |

(Continued)

FOREIGN PATENT DOCUMENTS

KR   101908263 B1   12/2018

OTHER PUBLICATIONS https://doi.org/10.1080/13675567.2017.1384451.
https://www.mdpi.com/2071-1050/12/9/3760.

*Primary Examiner* — Hosain T Alam
*Assistant Examiner* — Robert F May
(74) *Attorney, Agent, or Firm* — Caldwell Intellectual Property Law

(57) ABSTRACT

A method for scheduling a user transport comprising receiving, at a server, a plurality of communications from a client device, interrogating, at the server, each communication of the plurality of communications, initiating, at the server, a transport request as a function of a user request, inputting, at the server, the terminus datum in the transport request as a function of a first selected communication, inputting, at the server, a first selected unit identifier in the transport request, and generating, at the server, a verification datum as a function of a user submission datum.

20 Claims, 11 Drawing Sheets

(56) References Cited

U.S. PATENT DOCUMENTS

| | | | |
|---|---|---|---|
| 8,306,838 B2 | 11/2012 | Heise et al. | |
| 8,429,019 B1* | 4/2013 | Yeatts | G06Q 10/083 705/26.1 |
| 9,824,380 B1 | 11/2017 | Chowdhary et al. | |
| 2004/0225507 A1* | 11/2004 | Smith | G06Q 10/025 705/330 |
| 2005/0144089 A1 | 6/2005 | Kamiyama | |
| 2008/0183526 A1* | 7/2008 | Hancock | G06Q 10/08 705/7.22 |
| 2012/0030132 A1 | 2/2012 | Ouchi et al. | |
| 2013/0218912 A1* | 8/2013 | Howard | G06Q 30/0633 707/769 |
| 2014/0279669 A1* | 9/2014 | Bruns | G06Q 10/0631 705/341 |
| 2015/0228005 A1 | 8/2015 | Malone et al. | |
| 2016/0239801 A1* | 8/2016 | Burch et al. | G06Q 10/0838 |
| 2017/0262448 A1* | 9/2017 | Paulsen | G06F 16/24573 |
| 2018/0253673 A1* | 9/2018 | Langer | G06Q 10/06315 |
| 2019/0050121 A1* | 2/2019 | Millhouse | G06F 16/25 |
| 2020/0143319 A1 | 5/2020 | Fu et al. | |
| 2020/0349502 A1* | 11/2020 | Govekar | G06Q 10/0832 |

\* cited by examiner

METHODS AND SYSTEMS FOR SCHEDULING A USER TRANSPORT

FIELD OF THE INVENTION

The present invention generally relates to the field of shipment scheduling and logistics management. In particular, the present invention is directed to methods and systems for scheduling a user transport.

BACKGROUND

Coordinating transport of a unit is traditionally a process that allows for no visibility for a client and/or user. Summary level information is required to coordinate a transport of a unit while the greater details as to what is contained within a unit are isolated and not visible to those involved with the transport. As a result, a client and/or user has no knowledge as to what specific items are included in each unit to be transported. As a result, this can lead to the inability to proactively plan and the inability to easily obtain successful transport estimates.

SUMMARY OF THE DISCLOSURE

In one aspect, a system of scheduling a user transport is described. The system comprises a computing device designed and configured to extract, from a plurality of communications received from a client device, a communication detail datum, wherein the communication detail datum comprises a unit identifier and an associated terminus datum. The system further comprises a content generator, wherein the content generator is configured to receive a user request from a user device, wherein the user request comprises a ready datum, collect at least an available communication from an internal database as a function of the ready datum, and collect a unit identifier from the internal database as a function of a first selected communication received from the user device. The system further comprises a user-side module operating on the computing device, wherein the user-side module designs and configures the user device to generate a transport request in a display window at a display of the user device as a function of the user request. The display window includes a communication viewing portion displaying a first view of the transport request, a first available communication link in the communication viewing portion, wherein selection of the first available communication link creates an associated communication viewing portion within the display window and causes the associated communication viewing portion to load a first view of the at least a collected available communication, such that a first selected communication is transmitted to the computing device from the user device and displayed in the first available communication link, a terminus viewing portion, wherein selection of the first selected communication causes the associated terminus datum to be displayed as a function of a first selected communication, a first identifier link in the communication viewing portion, wherein selection of the first identifier link creates an associated identifier viewing portion within the transport request and causes the associated identifier viewing portion to load a first view of the collected unit identifier, such that a first selected unit identifier is transmitted to the computing device from the user device and displayed in the first identifier link, and a user submission link in the communication viewing portion, wherein selection of the user submission link creates a verification viewing portion displaying a verification datum.

In another aspect, a method of scheduling a user transport is described. The method comprises extracting, by a computing device, from a plurality of communications received from a client device, a communication detail datum, wherein the communication detail datum comprises a unit identifier and an associated terminus datum, receiving, by the computing device, a user request from a user device, wherein the user request comprises a ready datum, collecting, by the computing device, at least an available communication from an internal database as a function of the ready datum, and collecting, by the computing device, a unit identifier from the internal database as a function of a first selected communication received from the user device. The method further comprises configuring, by the computing device, the user device to generate a transport request in a display window at a display of the user device as a function of the user request. The display window includes a communication viewing portion displaying a first view of the transport request, a first available communication link in the communication viewing portion, wherein selection of the first available communication link creates an associated communication viewing portion within the display window and causes the associated communication viewing portion to load a first view of the at least an available communication, such that a first selected communication is transmitted to the computing device from the user device and displayed in the first available communication link, a terminus viewing portion displaying the associated terminus datum as a function of a first selected communication, a first identifier link in the communication viewing portion, wherein selection of the first available communication link creates an associated identifier viewing portion within the transport request and causes the associated identifier viewing portion to load a first view of the unit identifier, such that a first selected unit identifier is transmitted to the computing device from the user device and displayed in the first identifier link, and a user submission link in the communication viewing portion, wherein selection of the user submission link creates a verification viewing portion displaying a verification datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for scheduling a user transport. In an embodiment, a transport request may be initiated and completed, wherein upon completion a verification datum is generated and provided. The completed transport request may include a plurality of data, such as an article identifier datum, associated terminus datum, an available communication, an article quantity datum, an article detail datum, and a bound datum, to name a few. In an embodiment, the verification datum can allow a user and/or client to retrieve the status of the user transport and detailed information about the user transport. Such systems and methods provide numerous advantages by providing the user and/or client visibility as to each item included in a unit during coordination and transportation of the unit.

Figure 1:
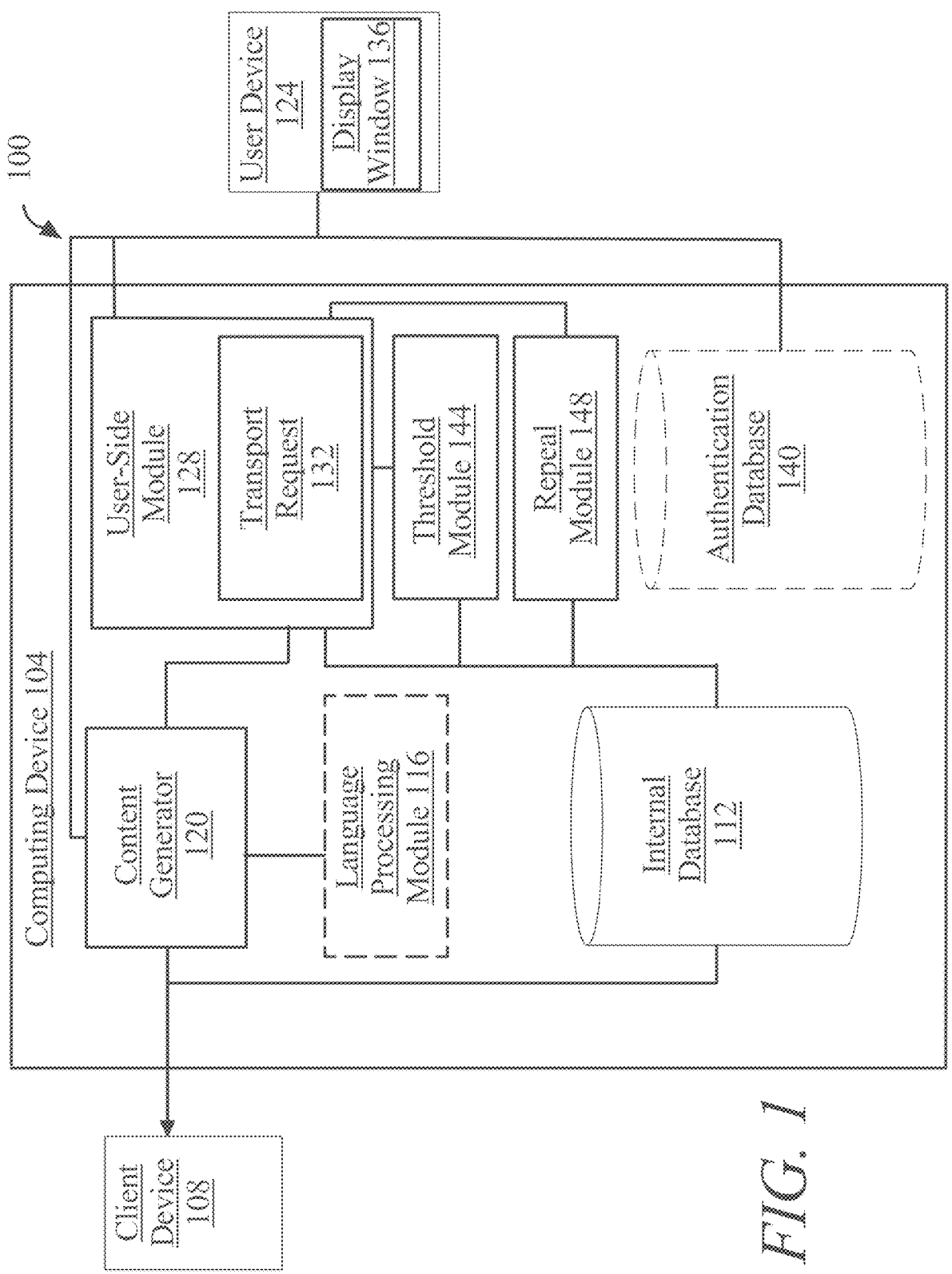
FIG. 1 is a block diagram illustrating an embodiment of a system for scheduling a user transport.

Referring now to the drawings, FIG. 1 illustrates a block diagram of a supplier shipment scheduling system 100. The configuration of system 100 is merely exemplary and should in no way be considered limiting. System 100 is configured to effectively schedule a supplier shipment and manage the entire ecosystem of supplier shipment. System 100 includes a computing device 104 which may communicated with a client device 108. Computing device 104 may be configured to receive a communication detail datum 116. Computing device 104 may include a language processing module 116, transport request 124, user device 124, internal database 112, verification datum 132, or any combination thereof.

Referring now to FIG. 1, supplier shipment scheduling system 100 is illustrated. Supplier shipment scheduling system 100 includes computing device 104. Computing device 104 may include any computing device as described in the entirety of this disclosure. For example and without limitation, a computing device may include a microcontroller, microprocessor, digital signal processor (DSP) and/or system on a chip (SoC), as described in further detail below. A computing device may include, be included in, and/or communicate with a mobile device such as a mobile telephone or smartphone. Sever 104 may include a single computing device operating independently, or may include two or more computing device operating in concert, in parallel, sequentially or the like; two or more computing devices may be included together in a single computing device or in two or more computing devices. Computing device 104 may communicate with one or more additional devices as described below in further detail via a network interface device. Network interface device may be utilized for connecting computing device 104 to one or more of a variety of networks and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice user (e.g., a mobile communications user data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, computing device 104 or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may include one or more computing devices implementing a "cloud" infrastructure, where data storage and processing tasks may be shared among various server devices according to dictates of load balancing, speed, computing efficiency, security, and/or efficient and robust data storage. Computing device 104 may be implemented using a "shared nothing" architecture in which data is cached at the worker, in an embodiment, this may enable scalability of system 100 and/or computing device.

Computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may communicated with client device 108. Client device 108 may include any computing device as described below in reference to FIG. 9. For example and without limitation, client device 108 may include a mobile device, desktop device, or other terminal device permitting a client to interact with system 100 and/or computing device 104 including without limitation by operation of a web browser or native application instantiating one or more user interfaces as directed, for instance, by server-side and/or client-side programs provided by computing device 104 in the form of a "website" or similar network-based application or suite of applications. Client device 108 may include, without limitation, a display in communication with computing device 104; the display may include any display as described in the entirety of this disclosure such as an light emitting diode (LED) screen, liquid crystal display (LCD), organic LED, cathode ray tube (CRT), touch screen, or any combination thereof. Output data from computing device 104 may be configured to be may be displayed on client device 108 using an output graphical user interface. An output graphical user interface may display any output as described in the entirety of this disclosure. System 100 can be configured to receive a plurality of communications from client device 108. The "plurality of communications" as described herein, is data detailing the request items from the client to the supplier. An item may include any product a supplier may sell, without limitation. For example and without limitation, each communication of the plurality of communications may include a purchase order from the user to the supplier. Each communication of the plurality of communications may include, as an example and without limitation, information detailing the type of item, quantity of the item, agreed upon price of the item, anticipated deliver state, any combination thereof, and/or the like. Persons skilled in the art, upon reviewing the entirety of this disclosure, will be aware of various communications that may be employed as the plurality of communications as described herein.

Still referring to FIG. 1, system 100 includes internal database 112. System 100 is configured to communicate with internal database 112. Internal database 112 may be implemented as any database and/or datastore suitable for use as internal database 112 as described in the entirety of this disclosure. An exemplary embodiment of internal database 112 is included below in reference to FIG. 2. System 100 can be configured to store each communication of the plurality of communication received from client device 108 in internal database 112. Storing may include any means of storing as described in the entirety of this disclosure. Persons skilled in the art, upon reviewing the entirety of this disclosure, will be aware of various examples of the plurality of communications that may be stored in the internal database consistently with this disclosure.

Continuing to refer to FIG. 1, system 100 and/or computing device 104 may be configured to extract, from the plurality of communications received from client device 108, a communication detail datum. Extracting communication detail datum from each communication of plurality of communications received from client device 108 may include generating the communication detail datum. A "communication detail datum," as used in this disclosure, is an element of data, wherein the element of data may include [an] a unit identifier datum and an associated terminus datum. A "unit identifier datum" as used in this disclosure, is a unique identifier associated with each item of the plurality of items included in each communication of the plurality of communication received from client device 108; a unique identifier may include any combination of alpha and/or numerical values, wherein there may be any total of values included in the unique identifier. Each unique identifier of unit identifier datum may be associated with an item able to be transmitted from a supplier to a destination. For example, and without limitation, a unit identifier datum may include a unique identifier of a combination of seven alpha and/or numeric values, such as "N303363", "K994002", "F110482", "AKK13257", and the like. In an embodiment, there is no limitation to the number of unit identifier datum included in each communication of the plurality of communication. Persons skilled in the art, upon reviewing the entirety of this disclosure, will be aware of various examples of unique identifiers that may be used as the unit identifier datum consistently with this disclosure. An "associated terminus datum" as used in this disclosure, is a final destination of a communication, such as any communication of a plurality of communications as described above. In an embodiment, for example and without limitation, a final destination may include details of a physical location, such as an address, coordinates, a unique identifier correlating to a physical location, or the like. For example and without limitation, a final destination may include "Magnus Warehousing 1301 39$^{th}$ Street N Fargo, N. Dak. 58102." Persons skilled in the art, upon reviewing the entirety of this disclosure, will be aware of various examples of physical locations that may be used as the associated terminus datum consistently with this disclosure.

Continuing to refer to FIG. 1, a communication detail datum may further include an unit quantity datum, a unit detail datum, and/or a bound datum. An "unit quantity datum" as used in this disclosure, is a quantity of an item of a plurality of items included in a communication of a plurality of communications as described above. A unit quantity datum, in an embodiment, may include any numeric value. For example, and without limitation, the unit quantity datum may include a quantity of "5", "25", "125" and the like. In an embodiment, there is no limitation to the number of unit quantity datum included in each communication of a plurality of communication received from client device 108. Persons skilled in the art, upon reviewing the entirety of this disclosure, will be aware of various numeric values that may be used as the unit quantity datum consistently with this disclosure. A "unit detail datum," as used in this disclosure, is a textual identifier, which may include any form of textual data as described above, detailing a description of each item of the plurality of items included in each communication of the plurality of communications. In an embodiment, without limitation, a unit detail datum may include a technical name of an item, a use of an item, a size of the item, a functional location of the item, advertising name for an item, any combination thereof, or the like. For example and without limitation, a unit detail datum may include brief descriptions, such as "Bracket, Cab Support", "Bracket, Front Right Bulkhead", "Angle, Platform", "Flange", "323E Track—Z-Lug", "42 in. Mower Blade", to name a few. In an embodiment, a number of unit detail datums included within each communication of a plurality of communication correlated directly to the number of the unit identifier datums included in each communication of the plurality of communications; however there is no limitation as to the quantity of unit detail datum included in each communication of the plurality of communications. Persons skilled in the art, upon reviewing the entirety of this disclosure, will be aware of various examples of descriptions of items that may be used as unit detail datums consistently with this disclosure. A "bound datum" as used in this disclosure, is a date by which each communication of the plurality of communications is to be delivered to the associated terminus datum. A date of a bound datum may be arranged in any format utilized for communicating the date. For example and without limitation, a bound datum for a delivery date of Jan. 8, 2020 may include, "01/08/2020", "Jan. 8, 2020", "2020-01-08", "08012020", "01082020", "Jan082020", any combination thereof, or the like. Persons skilled in the art, upon reviewing the entirety of this disclosure, will be aware of various examples of date formats that may be used for a bound datum consistently with this disclosure.

Still referring to FIG. 1, data information describing a unit identifier datum and/or an associated terminus datum may alternatively and/or additionally be extracted from each communication of the plurality of communications using a language processing module 116. In an embodiment, data information describing the unit quantity datum, the unit detail datum, bound datum, and the like may alternatively or additionally be extracted from one or more communication of the plurality of communications using language processing module 116. Language processing module 116 may include any hardware and/or software module. Language processing module 116 may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module 116 may compare extracted words to categories of unit identifier data recorded at computing device 104, one or more categories of associated terminus data recorded at computing device 104, one or more categories of unit quantity data recorded at computing device 104, one or more categories of unit detail data recorded at computing device 104, and/or one or more categories of bound data recorded at computing device 104; such data for comparison may be entered on computing device 104 as described above using data inputs or the like. In an embodiment, one or more categories may be enumerated, to find total count of mentions in such documents. Alternatively or additionally, language processing module 116 may operate to produce a language processing model. Language processing model may include a program automatically generated by computing device 104 and/or language processing module 116 to produce associations between one or more words extracted from at least a document and detect associations, including without limitation mathematical associations, between such words, and/or associations of extracted words with categories of unit identifier data, categories of associated terminus datum, categories of unit quantity data, categories of unit detail data, and/or categories of bound data. Associations between language elements, where language elements include for purposes herein extracted words, categories of unit identifier data, categories of associated terminus datum, categories of unit quantity data, categories of unit detail data, and/or categories of bound data may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given categories of unit identifier data, categories of associated terminus datum, categories of unit quantity data, categories of unit detail data, and/or categories of bound data. As a further example, statistical correlations and/or mathematical associations may include probabilistic formulas or relationships indicating a positive and/or negative association between at least an extracted word and/or a given categories of unit identifier data, categories of associated terminus datum, categories of unit quantity data, categories of unit detail data, and/or categories of bound data; positive or negative indication may include an indication that a given document is or is not indicating a categories of unit identifier data, categories of associated terminus datum, categories of unit quantity data, categories of unit detail data, and/or categories of bound data is or is not significant. For instance, and without limitation, a negative indication may be determined from a phrase such as "Mar. 34, 2020," whereas a positive indication may be determined from a phrase such as "Mar. 29, 2020," as an illustrative example; whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device 104, and/or the like.

Still referring to FIG. 1, language processing module 116, and/or computing device 104 may generate the language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted word category of physiological data, a given relationship of such categories to prognostic labels, and/or a given category of prognostic labels. There may be a finite number of category of physiological data, a given relationship of such categories to prognostic labels, and/or a given category of prognostic labels to which an extracted word may pertain; an HMI inference algorithm, such as the forward-backward algorithm or the Viterbi algorithm, may be used to estimate the most likely discrete state given a word or sequence of words. Language processing module 808 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model 116 may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module 116 may use a corpus of documents to generate associations between language elements in a language processing module 116, and/or computing device 104 may then use such associations to analyze words extracted from one or more documents and determine that the one or more documents indicate significance of a categories of unit identifier data, categories of associated terminus datum, categories of unit quantity data, categories of unit detail data, and/or categories of bound data. In an embodiment, computing device 104 may perform this analysis using a selected set of significant documents, such as documents identified by one or more experts as representing good science, good aviation analysis, good aviation standard, or the like; experts may identify or enter such documents via user device as described below, or may communicate identities of significant documents according to any other suitable method of electronic communication, or by providing such identity to other persons who may enter such identifications into computing device 104. Documents may be entered into computing device 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, computing device 104 may automatically obtain the document using such an identifier, for instance by submitting a request to a database or compendium of documents such as JSTOR as provided by Ithaka Harbors, Inc. of New York.

Still referring to FIG. 1, system 100 includes a content generator 120. Content generator 120 may be configured to operate on computing device 104. Content generator 120 may include any suitable hardware and/or software module as described in the entirety of this disclosure. Content generator 120 is configured to receive a user request from a user device 124. A user request may include a ready datum. A "user request" as used in this disclosure, is a confirmation by a user and/or user device 124 to initiate a transport request. In an embodiment, without limitation, receiving a user request from user device 124 may include a user at user device 124 selecting an icon, entering a textual string of data, selecting a text box, verbally confirming, and the like. For example and without limitation, receiving a user request from user device 124 may include a user at user device 124 selecting a text box labeled "New Transport Request". Persons skilled in the art, upon reviewing the entirety of this disclosure, will be aware of various means of confirmation that may be employed as a user request received from user device 124 as described herein. A "ready datum" as used in this disclosure, is a datum describing a date a user and/or user device 124 plans to execute transport request 124, such that each communication of a plurality of communications is fulfilled by each item of a plurality of items being delivered to a destination location as detailed in associated terminus data of each communication. In an embodiment, without limitation, extracting a communication detail datum may include a user and/or user device 124 manually submitting a ready datum, which may include the user at user device 124 manually entering a date, selecting a date from a calendar display, selecting a date from a drop-down menu, and the like. For example and without limitation, receiving a ready datum from user device 124 may include a user at user device 124 selecting "31" on a calendar display of the month of July in the year 2020. Persons skilled in the art, upon reviewing the entirety of this disclosure, will be aware of various calendar information that may be employed as the ready datum received from user device 124 as described herein. User device 124 may include any computing device as described below in reference to FIG. 9. For example and without limitation, user device 124 may include a mobile device, desktop device, or other terminal device permitting a user to interact with system 100 and/or computing device 104 including without limitation by operation of a web browser or native application instantiating one or more user interfaces as directed, for instance, by server-side and/or client-side programs provided by computing device 104 in the form of a "website" or similar network-based application or suite of applications. User device 124 may include, without limitation, a display in communication with computing device 104; the display may include any display as described in the entirety of this disclosure such as an light emitting diode (LED) screen, liquid crystal display (LCD), organic LED, cathode ray tube (CRT), touch screen, or any combination thereof. Output data from computing device 104 may be configured to be may be displayed in a display window on user device 124. The display window may include an output graphical user interface. An output graphical user interface may display any output as described in the entirety of this disclosure.

With continued reference to FIG. 1, content generator 120 is further configured to collect at least an available communication from internal database 112 as a function of a ready datum and collect a unit identifier from internal database 112 as a function of a first selected communication received from user device 124. An "available communication," as described in this disclosure, is one or more communications of a plurality of communications, wherein the one or more communications are stored in internal database 112 and not yet completed and/or entered in a completed transport request. Internal database 112 may include any database and/or datastore as described in further detail in reference to FIG. 2. Collecting at least an available communication from internal database 112 may include retrieving each communication of the plurality of communications from internal database 112, wherein each communication of the plurality of communication have yet to be included in the transport request. For example and without limitation, in an embodiment, collecting at least an available communication from internal database 112 may include retrieving each communication of the plurality of communications yet to be completed, wherein completion may include transportation to the destination location. Persons skilled in the art, upon reviewing the entirety of this disclosure, will be aware of various communications that may be employed as at least an available communication retrieved from internal database 112 as described herein.

Still referring to FIG. 1, content generator 120 is further configured to collect a unit identifier from internal database 112 as a function of the first selected communication received from user device 124. Collecting a unit identifier from internal database 112 may include retrieving one or more unit identifier associated with the first selected communication from internal database 112. The unit identifier may include any unit identifier as described in further detail above. Collecting may include any process, method, and/or means of collection and/or retrieval as described in further detail in the entirety of this disclosure. Internal database 112 may include any database and/or datastore as described in further detail in reference to FIG. 2. For example and without limitation, in an embodiment, collecting the unit identifier from internal database 112 may include retrieving the one or more unit identifier included in the first selected communication, wherein the one or more unit identifier was generated utilizing language processing module 116 as described above in further detail. Persons skilled in the art, upon reviewing the entirety of this disclosure, will be aware of various means of retrieval that may be employed as the unit identifier retrieved from internal database 112 as described herein. A "first selected communication" as used in this disclosure, is a communication of the at least an available communication in which the supplier and/or supplier device wants to include in the transport request, as described in further detail in the entirety of this disclosure.

Continuing to refer to FIG. 1, content generator 120 may be further configured to collect a unit detail datum from internal database 112 as a function of the first selected unit identifier received from user device 124. Collecting the unit detail datum from internal database 112 may include retrieving the unit detail datum associated with the first selected unit identifier from internal database 112, wherein both the unit detail datum and the first selected unit identifier are associated to the first selected communication. The unit detail datum may include any unit detail datum as described in further detail above. The unit identifier may include any unit identifier as described in further detail above. Collecting may include any process, method, and/or means of collection and/or retrieval as described in further detail in the entirety of this disclosure. Internal database 112 may include any database and/or datastore as described in further detail in reference to FIG. 2. For example and without limitation, in an embodiment, collecting the unit detail datum from internal database 112 may include retrieving the unit detail datum associated with the first selected unit identifier, wherein the unit detail datum was generated utilizing language processing module 116 as described above in further detail. Persons skilled in the art, upon reviewing the entirety of this disclosure, will be aware of various means of retrieval that may be employed as the unit detail datum retrieved from internal database 112 as described herein.

Still referring to FIG. 1, content generator 120 may be further configured to collect an allocation code from internal database 112 as a function of the first selected communication transmitted from user device 124. An "allocation code" as used in this disclosure, is a strong of alphanumeric characters assigned to each billing account associated with a client and/or client device 108. In an embodiment without limitation, the allocation code ensures the cost associated with transport request 124 is associated to the proper billing account of the client and/or client device. For example and without limitation, the allocation code may include a four-character identifier, such that one client and/or client device 108 has allocation codes corresponding to their warehouse locations, wherein the allocation codes include "9M00", "9M01", "9M02", "9M03", "9M04" and "9M05". As a further example and without limitation, the allocation code may include a three-character identifier, such that one client and/or client device 108 has allocation codes responding to the item type, wherein the allocation codes include "77A", "77B". "77C" "77D" and "77E". The allocation code may be stored in and/or collected from internal database 112. Internal database 112 may include any database and/or datastore as described in further detail below in reference to FIG. 2. Collecting may include any process, method and/or means of collecting and/or retrieving as described in further detail throughout the entirety of this disclosure.

With continued reference to FIG. 1, system 100 includes a user-side module 128 operating on computing device 104. User-side module 128 may include any hardware module or logic circuitry. User-side module 128 may be instantiated using one or more commands of computer control logic. User-side module 128 designs and configures the user device 124; user-side module 128 may design and configure user device 124 using one or more user-side programs, which may be generated using scripting languages such as JavaScript, executables such as applets or other compiled code, and the like; for instance, user-side module 128 may include a user-side program and/or scripting language embedded in the at least a collected available communication, the collected unit identifier or sets of data provided to user device 124. User-side module 128 may operate by reference to or combination with a library of commands; library of commands may be in any suitable form including computer-executable code, interpreted code, scripting, or any other form that may be used to configure a device as set forth in further detail below. Library may be provided on computing device 104 or on a third-party device, such as another server. In an embodiment, user-side module may operate by loading library and transmitting it to user device 124; alternatively user-side module may operate by referring user device to internal database 112 so user device can either download part or all of internal database 112, or be remotely configured by part or all of internal database 112. Each of these processes, singly or in combination, may be used by user-side module 128 to configure user device 124.

Still referring to FIG. 1, user-side module 128 may generate a transport request 132 in display window 136 at a display of user device 124. A "transport request" as used in this disclosure, is a compilation of data detailing each communication of the plurality of communications and the associated plurality of items to be transported to the destination location of the client. Transport request 132 may be a display that occupies the entirety of display window 136 and does not get replaced by other displays occupying the entirety of display window 136 during navigation of the at least a collected available communication, the collected unit identifier, and the like collected by computing device 104. The "display window" as used in this disclosure, may be a portion of a display of user device 124 used by user-side module and/or computing device 104 to display transport request 132, the at least a collected available communication, the unit identifier, and the like. Display window 136 may be an output graphical user interface, as described in further detail above. Display window 136 may be a window that ordinarily displays content when a user activates a link, such as a first available communication link, a first identifier link, and the like. For instance, where the display is a web browser, user selection of a link may cause the user device 124 to display content corresponding to a URL included in the link in display window 136. Display window 136 and/or transport request 132 may be configurable using executables, scripting languages, markup languages, and the like, including without limitation HTML, extensible stylesheet language transformations (XSLT), JavaScript, applets, and the like. Display window 136 may include a portion of a display of user device 124 to display the at least a collected available communication and/or collected unit identifier. Display window 136 may be a window that ordinarily displays content when a user activates a link such as first available communication link. For instance, where display window 136 is a web browser, user selection of a link may cause the display window 136 to display content corresponding to a URL included in the link in display window 136.

Continuing to refer to FIG. 1, display window 136 can include a communication viewing portion displaying a first view of transport request 132. Displaying the first view of transport request 132 may include any of the first view of transport request 132 as described above. User-side module 128 further designs and configures display window 136 of user device 124 to include a first available communication link in the communication viewing portion. Selection and/or activation of the first available communication link creates an associated communication viewing portion within display window 136. Selection and/or activation of the first available communication link causes the associated viewing portion to load a first view of the at least a collected available communication. First available communication link may be any item that performs the above-described action, including any item that is displayed on user device 124, including without limitation in display window 136 and may be activated by the user by way of any device and/or devices. As a non-limiting example, first available communication link may include a hyperlink containing or referring to a uniform resource locator (URL) referring to collected available communications; first available communication link may include any other item that when activated by a user causes the collected available communications to display in the entire display window 136 and/or transport request 132, including without limitation buttons, images, portions of images, and the like. Displaying the at least an available communication at the first available communication link may include any means of display as described in the entirety of this disclosure. In an embodiment, without limitation, displaying the at least an available communication may include a drop-down menu detailing the at least an available communication, a table detailing the at least an available communication, an icon and/or image detailing the at least an available communication, and the like. For example and without limitation, displaying the at least an available communication in first available communication link may include a drop-down menu accessed by selecting an empty text field designated for the at least an available communication, wherein the drop-down menu may include a unique identifier associated to a plurality of the at least an available communication, such as "5500186189", "451108006", "4511076734", and "5500202212". Persons skilled in the art, upon reviewing the entirety of this disclosure, will be aware of various means of display that may be employed as the at least an available communication is displayed in the first available communication link as described herein.

With continued reference to FIG. 1, computing device 104 and/or user-side module 128 are configured to receive a first selected communication from user device 124 and the first selected communication is displayed in the first available communication link. A "first selected communication" as described in this disclosure, is a communication of the at least an available communication in which the supplier and/or supplier device wants to include in transport request 124. Receiving the first selected communication from user device 124 may include any means of receiving as described above. For example and without limitation, receiving the first selected communication from user device 124 may include the user at user device 124 selecting the first selected communication from a drop-down menu of the unique identifier associated to the at least an available communication, such as selecting the unique identifier of "4511076734". Persons skilled in the art, upon reviewing the entirety of this disclosure, will be aware of various means of receiving that may be employed as the first selected communication received from user device 124 as described herein. Displaying the first selected communication in transport request 132 may include, in a non-limiting embodiment, inserting the first selected communication into a text field designated for the first selected communication. For example and without limitation, displaying the first selected communication in transport request 132 may include inserting the unique identifier associated with the first selected communication in the text field designated for the first selected communication, such as a text field filled with the unique identifier of "4511076734" associated with the first selected communication received from user device 124. Persons skilled in the art, upon reviewing the entirety of this disclosure, will be aware of various means of displaying that may be employed as the first selected communication is displayed in transport request 132 as described herein.

Still referring to FIG. 1, display window 136 of user device 124 further includes a terminus viewing portion. In an embodiment, selection of the first selected communication causes the associated terminus datum to be displayed. The associated terminus datum may include any associated terminus datum as described in the entirety of this disclosure. Displaying may include any means, method and/or process of displaying as described herein. For example and without limitation, displaying the associated terminus datum may include inserting the terminus datum associated with the first selected communication in the text field designated for terminus datum, such that the text field is filled with the terminus datum of "Magnum Warehousing 1301 39$^{th}$ St N Fargo, N. Dak. 58102". Persons skilled in the art, upon reviewing the entirety of this disclosure, will be aware of various means of displaying that may be employed as the associated terminus datum is displayed in transport request 124 as described herein.

Continuing to refer to FIG. 1, display window 136 of user device 124 further includes a first identifier link in the communication viewing portion. Selection and/or activation of the first identifier link creates an associated identifier viewing portion within display window 136. Selection and/or activation of the first identifier link causes the associated viewing portion to load a first view of the at least a collected unit identifier. First identifier link may be any item that performs the above-described action, including any item that is displayed on user device 124, including without limitation in display window 136 and may be activated by the user by way of any device and/or devices. As a non-limiting example, first identifier link may include a hyperlink containing or referring to a uniform resource locator (URL) referring to the collected unit identifier; first identifier link may include any other item that when activated by a user causes the collected unit identifier to display in the entire display window 136 and/or transport request 132, including without limitation buttons, images, portions of images, and the like. Displaying the collected identifier at the first identifier link may include any means of display as described in the entirety of this disclosure. In an embodiment and without limitation, displaying the unit identifier may include a drop-down menu detailing the unit identifier, a table detailing the unit identifier, an icon and/or image detailing the unit identifier, and the like. For example and without limitation, displaying the unit identifier to user device 124 may include a drop-down menu accessed by selecting an empty text field designated for the unit identifier, wherein the drop-down menu may include the unique identifier of the unit identifier datum, such as "N305721". Persons skilled in the art, upon reviewing the entirety of this disclosure, will be aware of various means of display that may be employed as the unit identifier is displayed on user device 124 as described herein.

Still referring to FIG. 1, computing device 104 and/or user-side module 128 are configured to receive a first selected unit identifier from user device 124 and the first selected unit identifier is displayed in the first identifier link. A "first selected unit identifier" as described in this disclosure, is the unit identifier in which the supplier and/or supplier device 128 wants to include in transport request 132, wherein the unit identifier describes the item in which the user and/or user device 124 wants to include in transport request 132. For example and without limitation, receiving the first selected unit identifier from user device 124 may include the user at user device 124 selecting the first selected unit identifier from a drop-down menu of the unique identifier of the one or more unit identifier, such as selecting the unit identifier of "KK11106". Persons skilled in the art, upon reviewing the entirety of this disclosure, will be aware of various means of receiving that may be employed as the first selected unit identifier received from user device 124 as described herein. Displaying a first selected unit identifier in first identifier link can include inserting the first selected unit identifier into a text field designated for the unit identifier, wherein the first selected unit identifier is received from user and/or user device 124. In a further non-limiting embodiment, for example, the first selected unit identifier may be manually input in the first identifier link, such that the first selected identifier link is an empty text field designated for the unit identifier by the user and/or user device 124. For example and without limitation, displaying the associated terminus datum may include inserting the first selected unit identifier received from user and/or user device 124 in the text field designated for the unit identifier, such that the text field is filled with the first selected unit identifier of "AN401288". Persons skilled in the art, upon reviewing the entirety of this disclosure, will be aware of various means of displaying that may be employed as the first selected unit identifier is displayed in first identifier link as described herein.

With continued reference to FIG. 1, display window 136 of user device 124 further includes a user submission link in the communication viewing portion. In an embodiment, selection of the user submission link creates a verification viewing portion displaying a verification datum. User submission link may be any item that performs the above-described action, including any item that is displayed on user device 124, including without limitation in display window 136 and may be activated by the user by way of any device and/or devices. As a non-limiting example, user submission link may include a hyperlink containing or referring to a uniform resource locator (URL) referring to the verification datum; user submission link may include any other item that when activated by a user causes the verification datum to display in the entire display window 136 and/or transport request 132, including without limitation buttons, images, portions of images, and the like. The "user submission" as used in this disclosure, is a confirmation by the user and/or user device 124 to complete transport request 124, wherein completion of transport request 124 signifies each selected communication of transport request 124 is ready to be transported to the terminus datum. Selection of the user submission from user device 124 may include any means, process, and/or method of receiving as described in the entirety of this disclosure. In an embodiment, without limitation, receiving the user submission link may include the user at user device 124 selecting an icon, entering a textual string of data, selecting a text box, verbally confirming, and the like. For example and without limitation, selection of the user submission link may include the user at user device 124 selecting a text box labeled "Submit". Persons skilled in the art, upon reviewing the entirety of this disclosure, will be aware of various means of confirmation that may be employed as the user submission received from user device 124 as described herein. The "completed transport request" as used herein, is transport request 124 at the time the user submission is received from user and/or user device 124, wherein the transport request may include any data and/or datum input in transport request 124 as described above in further detail. The completed transport request may be generated as a function of receiving the user submission datum from user device 124. The completed transport request can be stored in internal database 112. The completed transport request 124 may be stored in any suitable data and/or data type. For instance and without limitation, the completed transport request 124 may include textual data, such as numerical, character, and/or string data. Internal database 112 may include any internal database 112 as described in further detail below in reference to FIG. 2. Persons skilled in the art, upon reviewing the entirety of this disclosure, will be aware of various methods of storing that may be employed with the completed transport request 124 as described herein. The "verification datum" as described in this disclosure, is a unique identifier associated to the completed transport request 124, wherein the unique identifier may include any alpha-numeric character. In an embodiment, the verification datum may include any number of characters in any arrangement. In an embodiment and without limitation, the verification datum can be used as a reference to locate the completes transport request 132 within system 100 and/or computing device 104. For example and without limitation, the verification datum may include a unique identifier associated to the completed transport request, such as "A100-0038001". Displaying the verification datum in the user submission link can include any means of displaying as described in the entirety of this disclosure. In an embodiment and without limitation, displaying the verification datum in the user submission link may include a push notification, an email, a textual display, and/or the like. For example and without limitation, displaying verification datum may include a push notification including a textual display of "E2200-001". Persons skilled in the art, upon reviewing the entirety of this disclosure, will be aware of various means of displaying that may be employed as the verification datum 132 displayed in user submission link as described herein.

Still referring to FIG. 1, generating transport request 132 in display window 136 may further include a first unit detail link in the communication viewing portion. In an embodiment, selection of the first selected unit identifier causes the collected unit detail datum to be displayed in the first unit detail link. The collected unit detail datum may include any unit detail datum collected by content generator 120 as described above in further detail. Displaying the collected unit detail datum the first unit detail link can include inserting the collected and/or retrieved unit detail datum into a text field designated for the unit detail datum, wherein the unit detail datum is retrieved from internal database 112. For example and without limitation, displaying collected unit detail datum in first unit detail link may include inserting the unit detail datum retrieved from internal database 112 in the text field designated for the unit detail datum, such that the text field is filled with the unit detail datum of "BRACKET, BRACKET ASSEMBLY LH SIDE". Persons skilled in the art, upon reviewing the entirety of this disclosure, will be aware of various means of displaying that may be employed as the unit detail datum is displayed in transport request 132 as described herein.

Continuing to refer to FIG. 1, generating transport request 132 in display window 136 may further include a first allocation link in communication viewing portion. In an embodiment, selection of the first selected communication causes the collected allocation datum to be displayed in the first allocation link. Selection of the first selected communication may include any means, process, and/or method of selecting the first selected communication as described in further detail above. A collected allocation datum may include any allocation datum collected by content generator 120 as described above. Displaying the allocation code in the first allocation link can include inserting the allocation code retrieved from internal database 112 in a text field designated for the allocation code of the first selected communication. For example and without limitation, displaying the collected allocation code in the first allocation link in a text field designated for the allocation code, such that the text field is filled with an allocation code of "8001". In an embodiment, the allocation code may be collected from internal database 112 and displayed in transport request 124 as a function of any communication of the plurality of communications selected by the user and/or user device 124. Persons skilled in the art, upon reviewing the entirety of this disclosure, will be aware of various means of displaying that may be employed as the collected allocation code is displayed in the first allocation link as described herein.

With continued reference to FIG. 1, content generator 120 may be further configured to collect at least a second available communication as a function of the terminus datum associated to the first selected communication transmitted from user device 124. At least a "second available communication" as used in this disclosure, may include one or more communication of the plurality of communications, wherein the communication and the first selected communication have the same associated terminus datum. Collecting the at least a second available communication from the internal database 112 as a function of the terminus datum associated to the first selected communication can include retrieving only the at least an available communication with a terminus datum equal to the terminus datum of the first selected available communication, such that the terminus datum associated with the at least an available communication and the terminus datum of the first selected available communication are the same. The at least a second available communication may include any available communication as described in further detail in the entirety of this disclosure. Collecting may include any process, method, and/or means of retrieval as described in further detail in the entirety of this disclosure. Internal database 112 may include any database and/or datastore as described in further detail in reference to FIG. 2. For example and without limitation, in an embodiment, collecting the at least an available communication from internal database 112 as a function of the terminus datum associated to the first selected communication may include collecting and/or retrieving the one or more communication of the plurality of communication, wherein the one or more communication and the first selected communication share an terminus datum of "Magnum Warehousing 1301 39th St N Fargo, N. Dak. 58102". Persons skilled in the art, upon reviewing the entirety of this disclosure, will be aware of various means of collecting that may be employed as the at least an available communication collected from internal database 112 as described herein.

Continuing to refer to FIG. 1, generating transport request 132 in display window 136 may further include a second available communication link in the communication viewing portion. Selection and/or activation of the second available communication link creates an associated communication viewing portion within display window 136. Selection and/or activation of the second available communication link causes the associated viewing portion to load a first view of the at least a collected second available communication. Second available communication link may be any item that performs the above-described action, including any item that is displayed on user device 124, including without limitation in display window 136 and may be activated by the user by way of any device and/or devices. As a non-limiting example, second available communication link may include a hyperlink containing or referring to a uniform resource locator (URL) referring to collected second available communications; second available communication link may include any other item that when activated by a user causes the collected second available communications to display in the entire display window 136 and/or transport request 132, including without limitation buttons, images, portions of images, and the like. Loading the first view of the at least a collected second available communication may include any means of display as described in the entirety of this disclosure. In an embodiment, without limitation, loading the first view of the at least a collected second available communication may include a drop-down menu detailing the collected second available communication as a function of the terminus datum associated to the first selected communication, a table detailing the collected second available communication as a function of the terminus datum associated to the first selected communication, an icon and/or image detailing the collected second available communication as a function of the terminus datum associated to the first selected communication, and the like. For example and without limitation, loading the first view of the at least a collected second available communication may include a drop-down menu accessed by selecting an empty text field designated for the collected second available communication, wherein the drop-down menu may include a unique identifier associated to a plurality of the at least an available communication, such as "4400186189", "321108006", "3211076734", and "3300202212". Persons skilled in the art, upon reviewing the entirety of this disclosure, will be aware of various means of loading that may be employed as the collected second available communication as a function of the terminus datum associated to the first selected communication is loaded in display window 136 as described herein.

Still referring to FIG. 1, computing device 104 and/or user-side module 128 are configured to receive a second selected communication from user device 124 and the second selected communication is displayed in the second available communication link. A "second selected available communication" as described in this disclosure, is a communication of the at least an available communication in which the supplier and/or supplier device wants to include in transport request 124, wherein the available communication has the same associated terminus datum as the first selected communication. Receiving the second selected available communication from user device 124 may include any means of receiving as described above. For example and without limitation, receiving the second selected available communication from user device 124 may include the user at user device 124 selecting the second selected available communication from a drop-down menu of the unique identifier associated to the at least an available communication as a function of the terminus datum associated to the first selected communication, such as selecting the unique identifier of "3211042734". Persons skilled in the art, upon reviewing the entirety of this disclosure, will be aware of various means of receiving that may be employed as the second selected available communication received from user device 124 as described herein. Displaying the second selected available communication in the second available communication link may include, in a non-limiting embodiment, inserting the second selected available communication into a text field designated for the second selected available communication. For example and without limitation, displaying the second selected available communication in the second available communication link may include inserting the unique identifier associated with the second selected available communication in the text field designated for the second selected available communication, such as a text field filled with the unique identifier of "3211042734" associated with the second selected available communication received from user device 124. Persons skilled in the art, upon reviewing the entirety of this disclosure, will be aware of various means of displaying that may be employed as the second selected available communication is displayed in the second available communication link as described herein.

Still referring to FIG. 1, content generator 120 may be further configured to collect a second unit identifier as a function of the second selected communication transmitted from user device 124. Collecting the second unit identifier from internal database 112 can include collecting and/or retrieving one or more unit identifier associated with the second selected available communication from internal database 112. The second unit identifier may include any unit identifier as described in further detail above. Collecting may include any process, method, and/or means of collection and/or retrieval as described in further detail in the entirety of this disclosure. Internal database 112 may include any database and/or datastore as described in further detail in reference to FIG. 2. For example and without limitation, in an embodiment, collecting the unit identifier from internal database 112 may include collecting the one or more unit identifier included in the second selected available communication, wherein the one or more second unit identifier was generated utilizing language processing module 116 as described above in further detail. Persons skilled in the art, upon reviewing the entirety of this disclosure, will be aware of various means of collection that may be employed as the second unit identifier collected from internal database 112 as described herein.

With continued reference to FIG. 1, generating transport request 132 in display window 136 may further include a second identifier link in the communication viewing portion. Selection and/or activation of the second identifier link creates an associated identifier viewing portion within display window 136 and/or transport request 132. Selection and/or activation of the second identifier link causes the associated viewing portion to load a first view of the collected second unit identifier. Second identifier link may be any item that performs the above-described action, including any item that is displayed on user device 124, including without limitation in display window 136 and may be activated by the user by way of any device and/or devices. As a non-limiting example, second identifier link may include a hyperlink containing or referring to a uniform resource locator (URL) referring to the collected second unit identifier; second identifier link may include any other item that when activated by a user causes the collected second unit identifier to display in the entire display window 136 and/or transport request 132, including without limitation buttons, images, portions of images, and the like. Displaying the collected second unit identifier to user device 124 may include any means of display as described in the entirety of this disclosure. In an embodiment and without limitation, displaying the collected second unit identifier may include a drop-down menu detailing the collected second unit identifier, a table detailing the collected second unit identifier, an icon and/or image detailing the collected second unit identifier, and the like, as described above in further detail. For example and without limitation, displaying the collected second unit identifier to user device 124 may include a drop-down menu accessed by selecting an empty text field designated for the unit identifier, wherein the drop-down menu may include the unique identifier of the unit identifier datum, such as "B305721". Persons skilled in the art, upon reviewing the entirety of this disclosure, will be aware of various means of display that may be employed as the collected second unit identifier is displayed on user device 124 as described herein.

With continued reference to FIG. 1, computing device 104 and/or user-side module 128 are configured to receive a selected unit identifier from user device 124 and the selected unit identifier is displayed in the second identifier link. Receiving the second selected unit identifier from the user and/or user device 124 can include any means of receiving as described in the entirety of this disclosure. A "second selected unit identifier" as described in this disclosure, is the unit identifier in which the user and/or user device 124 wants to include in transport request 132, wherein the unit identifier describes the item associated with the second selected available communication in which the user and/or user device 124 wants to include in transport request 132. For example and without limitation, receiving the second selected unit identifier from user device 124 may include the user at user device 124 selecting the second selected unit identifier from a drop-down menu of the unique identifier of the one or more unit identifier, such as selecting the unit identifier of "AN401288". Persons skilled in the art, upon reviewing the entirety of this disclosure, will be aware of various means of receiving that may be employed as the second selected unit identifier received from user device 124 as described herein. Displaying a second selected unit identifier in the second identifier link can include inserting the second selected unit identifier into a text field designated for the unit identifier, wherein the second selected unit identifier is received from user and/or user device 124. In a further non-limiting embodiment, for example, the second selected unit identifier may be manually input in the second identifier link, such that the second identifier link is an empty text field designated for the unit identifier by the user and/or user device 124. For example and without limitation, displaying the second selected unit identifier in the second identifier link may include inserting the second selected unit identifier received from user and/or user device 124 in the text field designated for the unit identifier, such that the text field is filled with the second selected unit identifier of "KP309662". Persons skilled in the art, upon reviewing the entirety of this disclosure, will be aware of various means of displaying that may be employed as the second selected unit identifier is displayed in the second identifier link as described herein.

Continuing to refer to FIG. 1, generating transport request 132 in display window 136 may further include a ready viewing portion. In an embodiment, receiving the ready datum from user device 124 causes the ready datum to be displayed in the ready viewing portion. The ready datum may include any ready datum as described above in further detail. Receiving the ready datum from user device 124 may include any means, method, and/or process of receiving as described in further detail above. Displaying may include any means, process, and/or method of displaying as described in the entirety of this disclosure. In an embodiment and without limitation, displaying the ready datum in the ready viewing portion, such that the ready viewing portion may input the ready datum in a blank text field designated for the ready datum.

Still referring to FIG. 1, system 100 and/or computing device 104 may further include threshold module 144. Threshold module 144 may include any software and/or hardware module. Threshold module 144 can be configured to identify the ready datum and the bound datum are outside a threshold as a function of the user submission datum received from user device 124. Identifying the ready datum and the bound datum are outside a threshold as a function of the completed transport request 124 may include retrieving the bound datum of the one or more selected communications included in completed transport request 124 and comparing the retrieved bound datum to the ready datum associated to the completed transport request 124. A "threshold" as described in this disclosure, is an amount of time the client is able to receive an early delivery of the completed transport request 124 to the terminus datum. The threshold may be received from the client device 108 for each communication of the plurality of communications received and/or a fixed threshold for the plurality of communication received from client device 108. The time of the threshold may be measured in hours, days, weeks, months, and the like. Identifying the ready datum and the bound datum are outside a threshold can include, for example and without limitation, a ready datum of "Oct. 18, 2020" and a bound datum of "Dec. 1, 2020", wherein the threshold is three weeks. As a further example and without limitation, identifying the ready datum and the bound datum are outside a threshold may include the ready datum of "Apr. 2, 2021" and a bound datum of "Apr. 15, 2021", wherein the threshold is 10 days.

With continued reference to FIG. 1, threshold module 144 may design and configured client device 108 to generate a threshold alert in display window 136 as a function of the identification of the ready datum and bound datum outside the threshold. The threshold alert can include an alert viewing portion, wherein the alert viewing portion displays a first view of the verification datum. A "threshold alert" as used in this disclosure, may include a notification to the client and/or client device that the ready datum and the bound datum are outside the threshold. Displaying the first view of the verification datum can include any means of display as described in the entirety of this disclosure. In an embodiment and without limitation, displaying the first view of the verification datum may include a push notification, an email, a textual display, and/or the like. For example and without limitation, displaying the first view of the verification datum may include an email including the verification datum, wherein the email notifies the client and/or client device 108 of the ready datum and the bound datum outside the threshold. Persons skilled in the art, upon reviewing the entirety of this disclosure, will be aware of various means of display that may be employed as the verification datum displayed to client device 108 as described herein.

Continuing to refer to FIG. 1, system 100 and/or computing device 104 may further include repeal module 148. Repeal module 148 may include any suitable hardware and/or software module. Repeal module 148 may be further configured to receive a repeal datum from client device 108, wherein repeal datum is associated to a communication of the plurality of communications. A "repeal datum" as described in this disclosure, is a confirmation from the client and/or client device 108 to not include one or more communication of the plurality of communications in transport request 124 and/or display window 136, wherein the client does not want the communication to be transported to the terminus datum. Receiving the repeal datum from client device 108 may include any means of receiving as described in the entirety of this disclosure. In an embodiment, without limitation, receiving the repeal datum from client device 108 may include the client at client device 108 selecting an icon, entering a textual string of data, selecting a text box, verbally confirming, and the like. For example and without limitation, receiving the repeal datum from client device 108 may include the client at client device 108 selecting a text box labeled "Terminate Purchase Order". Persons skilled in the art, upon reviewing the entirety of this disclosure, will be aware of various means of confirmation of repeal that may be employed as the repeal datum received from user device 108 as described herein.

Still referring to FIG. 1, repeal module 148 may be further configured to terminate the communication of plurality of communications associated to the repeal datum from internal database 112. Terminating the one or more communication of the plurality of communications associated to the repeal datum from internal database 112 can include identifying the communication of the plurality of communications in internal database 112 and removing the communication of the plurality of communications from a stored location in internal database 112. In an embodiment, terminating the communication of the plurality of communications associated to the repeal datum may include the inability to include the communication in transport request 124. For example and without limitation, receiving a repeal datum confirming repeal of the communication, wherein the communication has a unique identifier of "5500638721" will result in terminating the communication having a unique identifier of "5500638721" from internal database 112, wherein "5500638721" will not be included on any transport request 124. Terminating the completed transport request 124 as a function of the first selected communication can include, in an embodiment, terminating the completed transport request 124, wherein the first selected communication and the associated communication of the repeal datum are the same. For example and without limitation, a completed transport request 124 including the first selected communication with a unique identifier of "5500654475" will be terminated if a repeal datum is received, wherein the repeal datum is associated to the communication with a unique identifier of "5500654475". Persons skilled in the art, upon reviewing the entirety of this disclosure, will be aware of various means of termination that may be employed as the one or more communication is terminated as described herein.

Continuing to refer FIG. 1, repeal module 148 may design and configure user device 124 to generate a repeal alert in display window 136 as a function of the repeal datum. The repeal alert can include a repeal viewing portion, wherein the repeal viewing portion displays a first view of the repeal datum. A "repeal alert" as used in this disclosure, may include a notification to the user and/or user device 124 that the client does not wish to deliver the communication of the plurality of communications to the terminus datum. Displaying the first view of the repeal datum can include any means of display as described in the entirety of this disclosure. In an embodiment and without limitation, displaying the first view of the repeal datum may include a push notification, an email, a textual display, and/or the like. For example and without limitation, displaying the first view of the repeal datum may include an email notification including a textual display of "Terminated Purchase Order: 5500638721". Persons skilled in the art, upon reviewing the entirety of this disclosure, will be aware of various means of displaying that may be employed as the first view of the repeal datum as described herein.

With continued reference to FIG. 1, system 100 and/or computing device 104 can be configured to receive a credential from user device 124, compare the credential from user device 124 to an authorized credential stored within an authentication database 140, and authenticate user device 124 based on the identification of the credential from user device 124 to an authorized credential stored within authentication database 140. A "credential" as described in the entirety of this disclosure, is a datum representing an identity, attribute, code, and/or characteristic specific to a user and/or user device 124. For example and without limitation, the credential may include a username and password unique to the user and/or user device 124. The username and password may include any alpha-numeric character, letter case, and/or special character. As a further example and without limitation, the credential may include a digital certificate, such as a PKI certificate. In an embodiment, the credential may include a datum representing an identity, attribute, code, and/or characteristic specific to a client and/or client device 108.

Still referring to FIG. 1, in an embodiment, computing device 104 may compare the credential from user device 124 to an authorized credential stored in authentication database 140. For example, system 100 and/or computing device 104 can be configured to compare the credential received from user device 124 to a stored authorized credential to determine if the credential matches the stored authorized credential. As a further embodiment, computing device 104 may compare the credential from client device 108 to an authorized credential stored in authentication database 140. For example, computing device 104 can be configured to compare the from client device 108 to a stored authorized credential to determine if the credential matches the stored authorized credential. In embodiments, comparing the credential to an authorized credential stored in authentication database 204 can include identifying an authorized credential stored in authentication database 140 by matching credential 200 to at least one authorized credential stored in authentication database 140. System 100 and/or computing device 104 may include or communicate with authentication database 140. Authentication database 140 may be implemented as any database and/or datastore suitable for use as authentication database 140 as described in the entirety of this disclosure. An exemplary embodiment of authentication database 140 is included below in reference to FIG. 3. An "authorized credential" as described in the entirety of this disclosure, is the unique identifier that will successfully authorize each user and/or user device 124 if received. For example and without limitation, the authorized credential is the correct alpha-numeric spelling, letter case, and special characters of the username and password for user device 124. As a further example and without limitation, authorized credential is the correct alpha-numeric spelling, letter case, and special characters of the username and password for client device 108. Persons skilled in the art, upon reviewing the entirety of this disclosure, will be aware of various examples of authorized credentials that may be stored in the authentication database consistently with this disclosure.

Still referring to FIG. 1, authentication module 108 operating on computing device 104 is further designed and configured to authenticate user device 124 based on the identification of the credential from user device 124 to the authorized credential stored within authentication database 140. Authenticating, for example and without limitation, can include determining a user's ability/authorization to access information included in any data, process, module and/or engine operating on computing device 104. As a further example and without limitation, authentication may include determining a user's authorization/ability of access to the information included in internal database 112 operating on computing device 104. Authenticating may include permitting access to user device 124 to access the information included in any data, process, module and/or engine operating on computing device 104. Authentication may enable access to an individual database and/or process, a combination of databases and/or processes, and/or all the databases and/or processes operating on computing device 104, as described in further detail in the entirety of this disclosure. As a further example and without limitation, authentication may include authentication for client device 108 based on the identification of the credential from the client device 108 to the authorized credential stored within authentication database 140.

Figure 2:
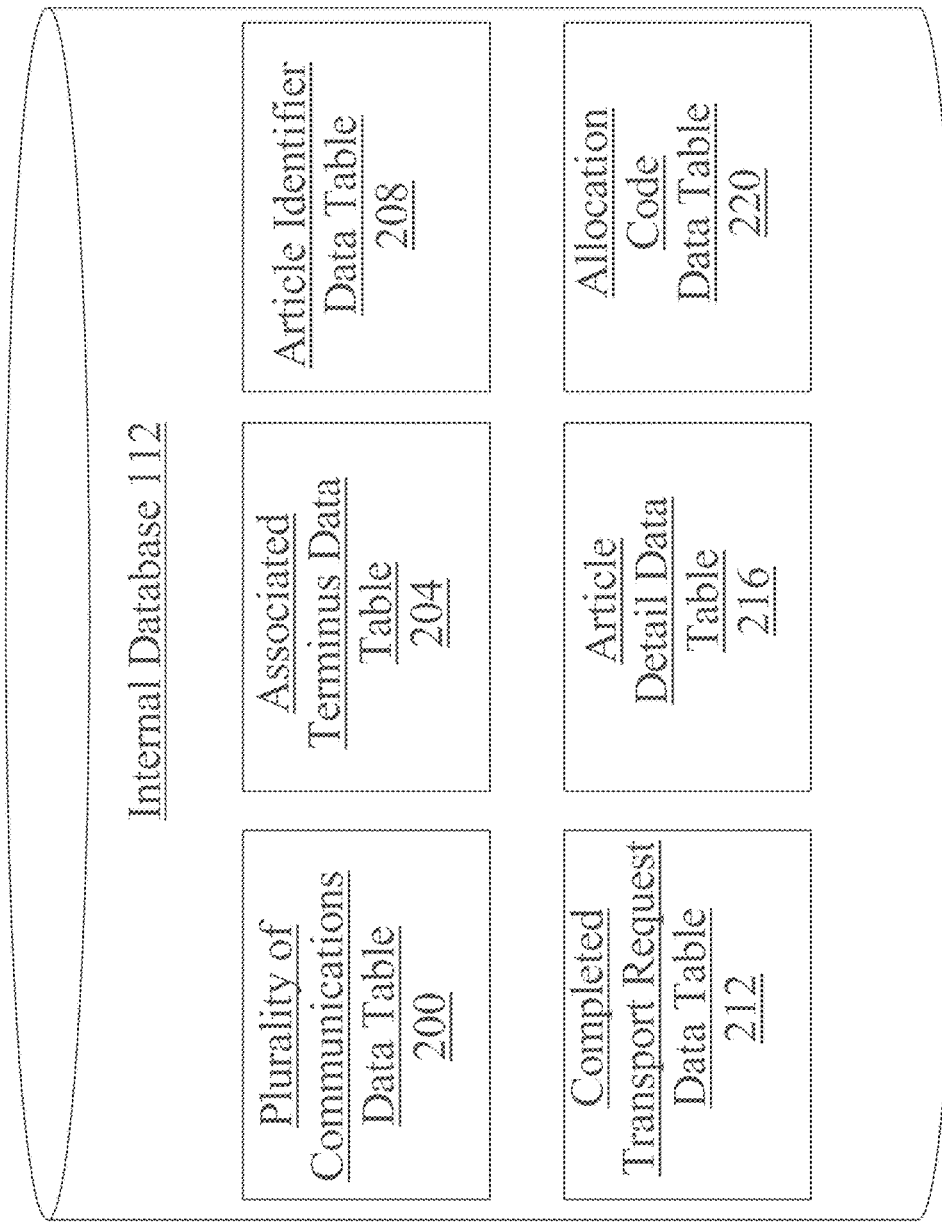
FIG. 2 is a block diagram illustrating an embodiment of an internal database.

Continuing to refer to FIG. 1, system 100 and/or computing device 104 can be configured to receive a repeal datum from client device 108, wherein the repeal datum is associated to a communication of the plurality of communications and terminate the completed transport request 124 as a function of the repeal datum. With continued reference to FIG. 1, terminating the completed transport request 124 as a function of the first selected communication is configured to include transmitting the repeal datum to user device 124 and removing the one or more communication of the plurality of communications associated with the repeal datum from internal database 112. Referring now to FIG. 2, an embodiment of internal database 112 is illustrated. Internal database 112 may include any data structure for ordered storage and retrieval of data, which may be implemented as a hardware or software module. Internal database 112 may be implemented, without limitation, as a relational database, a key-value retrieval datastore such as a NOSQL database, or any other format or structure for use as a datastore that a person skilled in the art would recognize as suitable upon review of the entirety of this disclosure. Internal database 112 may include a plurality of data entries and/or records corresponding to elements as described above. Data entries and/or records may describe, without limitation, data concerning the plurality of communications, associated terminus datum, unit identifier datum, completed transport request data, unit detail datum, and allocation code data.

Still referring to FIG. 2, one or more database tables in internal database 112 may include, as a non-limiting example, a plurality of communications data table 200. Plurality of communications data table 200 may be a table storing each communication of the plurality of communications received from client device 108. For instance, and without limitation, internal database 112 may include plurality of communications data table 200 listing each communication of the plurality of communications and associated unique identifier, such as "5500192446".

Continuing to refer to FIG. 2, one or more database tables in internal database 112 may include, as a non-limiting example, an available terminus data table 204. Available terminus data table 204 may be a table storing the associated terminus datum generated by computing device 104 as a function of interrogating each communication of the plurality of communications received from client device 108. For instance, and without limitation, internal database 112 may include an available terminus data table 204 listing the associated terminus datum generated by computing device 104 as a function of interrogating each communication of the plurality of communications received from client device 108, such as "Magnum Warehousing 1301 39$^{th}$ Street N Fargo, N. Dak. 58102".

With continued reference to FIG. 2, one or more database tables in internal database 112 may include, as a non-limiting example, an unit identifier data table 208. Unit identifier data table 208 may be a table storing the unit identifier datum generated by computing device 104 as a function of interrogating each communication of the plurality of communications received from client device 108. For instance, and without limitation, internal database 112 may include an unit identifier datum listing an unit identifier datum generated by computing device 104 as a function of interrogating each communication of the plurality of communications received from client device 108, such as the unique identifier of "N303363", "K994002", "F110482", and the like.

Still referring to FIG. 2, one or more database tables in internal database 112 may include, as a non-limiting example, a completed transport request data table 212. Completed transport request data table 212 may be a table storing the completed transport request 124 initiated by computing device 104 as a function of the user request received from user device 124. For instance, and without limitation, internal database 112 may include a completed transport request data table 212 listing a completed transport request 124 generated by computing device 104 as a function of the user request received from user device 124. The completed transport request 124 may include any completed transport request 124 as described in the entirety of this disclosure.

Continuing to refer to FIG. 2, one or more database tables in internal database 112 may include, as a non-limiting example, an unit detail data table 216. Unit detail data table 216 may be a table storing the unit detail datum generated by computing device 104 as a function of interrogating each communication of the plurality of communications received from client device 108. For instance, and without limitation, internal database 112 may include an unit detail datum table 216 listing an unit detail datum generated by computing device 104 as a function of interrogating each communication of the plurality of communications received from client device 108, such as the brief description of "Bracket, Front Right Bulkhead".

With continued reference to FIG. 2, one or more database tables in internal database 112 may include, as a non-limiting example, an allocation code data table 220. Allocation code data table 220 may be a table storing the allocation code. The allocation code may be received from a user and/or user device 124. For instance, and without limitation, internal database 112 may include an allocation code table 220 listing an allocation code received from user device 124. The allocation code may include any allocation code as described in the entirety of this disclosure. Tables presented above are presented for exemplary purposes only; persons skilled in the art will be aware of various ways in which data may be organized in internal database 112 consistently with this disclosure.

Figure 3:
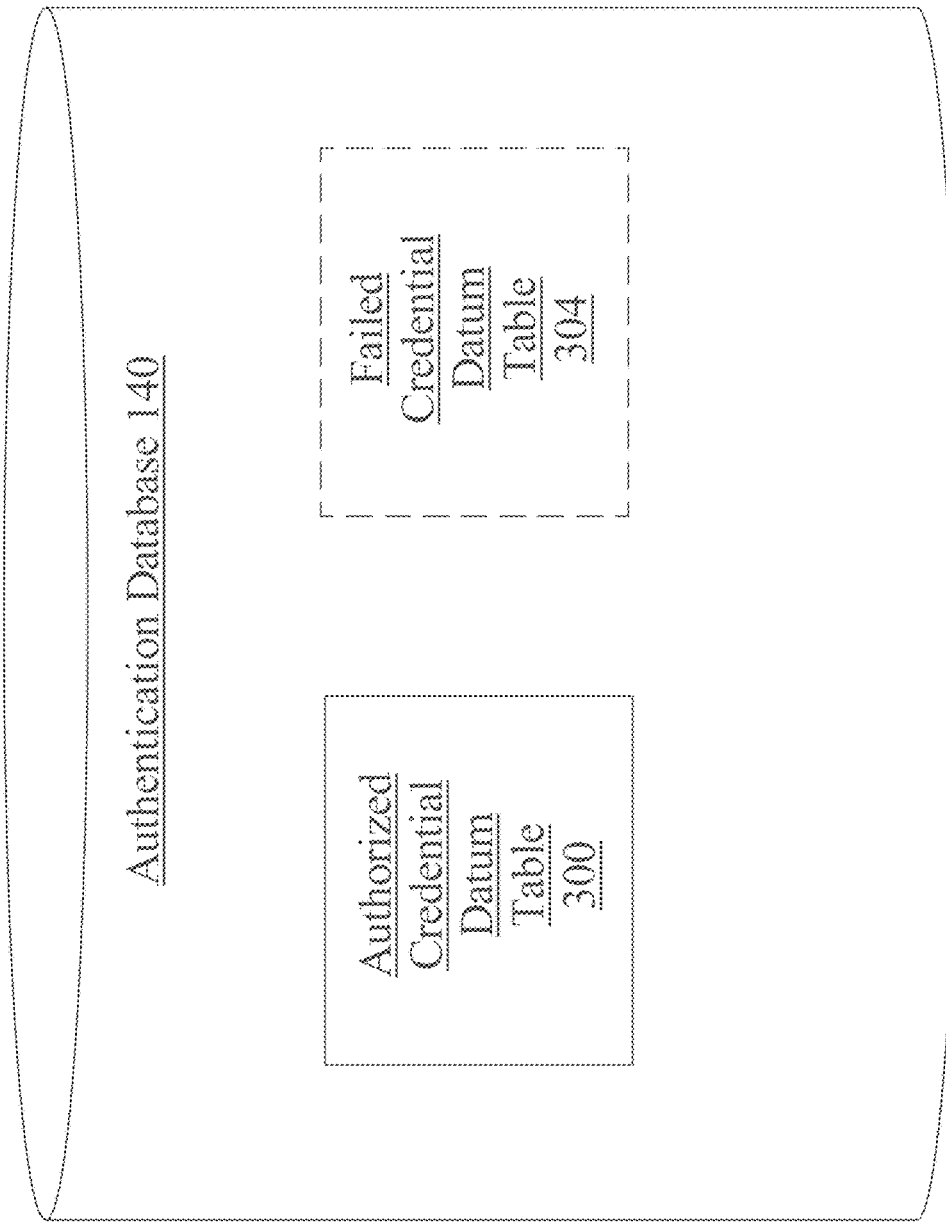
FIG. 3 is a block diagram illustrating an embodiment of an authentication database.

Referring now to FIG. 3, an embodiment of authentication database 140 is illustrated. Authentication database 140 may include any data structure for ordered storage and retrieval of data, which may be implemented as a hardware or software module. Authentication database 140 may be implemented, without limitation, as a relational database, a key-value retrieval datastore such as a NOSQL database, or any other format or structure for use as a datastore that a person skilled in the art would recognize as suitable upon review of the entirety of this disclosure. Authorization database 136 may include a plurality of data entries and/or records corresponding to credentials as described above. Data entries and/or records may describe, without limitation, data concerning authorized credential datum and failed credential datum.

With continued reference to FIG. 3, one or more database tables in authentication database 140 may include as a non-limiting example an authorized credential datum table 300. Authorized credential datum table 300 may be a table storing authorized credentials, wherein the authorized credentials may be for client device 108 and/or user device 124, as described in further detail in the entirety of this disclosure. For instance, and without limitation, authentication database 140 may include an authorized credential datum table 300 listing unique identifiers stored for user device 124, wherein the authorized credential is compared/matched to a credential received from user device 124.

Still referring to FIG. 3, one or more database tables in authentication database 140 may include, as a non-limiting example, failed credential datum table 304. A "failed credential", as described in the entirety of this disclosure, is a credential received from a device that did not match an authorized credential stored within authorized credential datum table 300 of authentication database 140. Such credentials can be received from client device 108 and/or user device 124. Failed credential datum table 304 may be a table storing and/or matching failed credentials. For instance and without limitation, authentication database 140 may include failed credential datum table 304 listing incorrect unique identifiers received by a device in computing device 104, wherein authentication of the device did not result. Tables presented above are presented for exemplary purposes only; persons skilled in the art will be aware of various ways in which data may be organized in authentication database 140 consistently with this disclosure.

Figure 4:
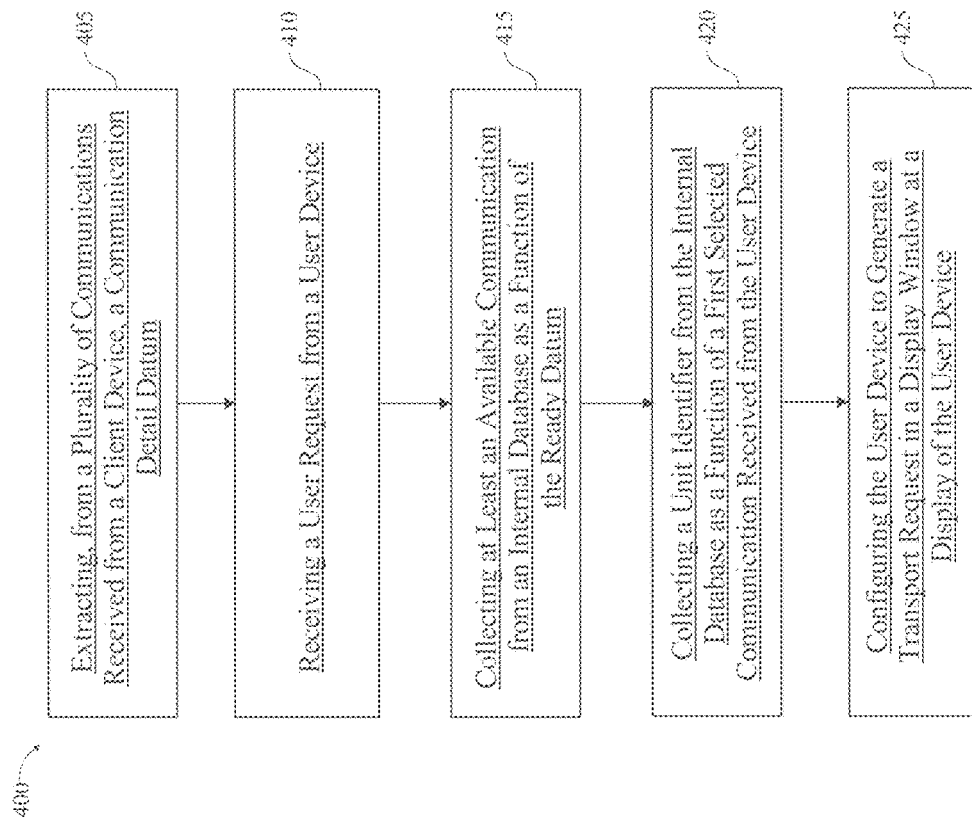
FIG. 4 is a flow diagram illustrating an embodiment of the method of scheduling a user transport.

Referring now to FIG. 4, an embodiment of a method 400 for scheduling a user transport is illustrated. At step 405 system 100, extracts, from a plurality of communications received from client device 108, a communication detail datum by computing device 104. Communication detail datum may include a unit identifier and an associated terminus datum. The plurality of communications may include any plurality of communications as described above in further detail in reference to FIG. 1. For example and without limitation, each communication of the plurality of communications may include a purchase order from the user to the supplier. Each communication of the plurality of communications may include, as an example and without limitation, information detailing the type of item, quantity of the item, agreed upon price of the item, anticipated deliver state, any combination thereof, and/or the like. Receiving may include any means, process and/or network methodology of receiving as described in the entirety of this disclosure. Each communication of the plurality of communications may be extracted utilizing any of the methodologies as described herein. Extraction of each communication of the plurality of communications can include generating communication detail datum 116, wherein communication detail datum 116 includes an unit identifier datum and an associated terminus datum.

Communication detail datum 116 may be generated utilizing any process and/or network methodology as described in the entirety of this disclosure. The unit identifier datum may include any unit identifier datum as described in the entirety of this disclosure. In an embodiment, the unit identifier datum may include a unique identifier, wherein the unique identifier can include any combination of alpha and/or numerical values, wherein there may be any total of values. Each unique identifier of the unit identifier datum is associated with an item able to be transmitted from the supplier to a destination, such as an associated terminus datum. For example and without limitation, unit identifier datum may include the unique identifier of a combination of seven alpha and/or numeric values, such as "N303363", "K994002", "F110482", "AKK1327", and the like. In an embodiment, there is no limitation to the number of unit identifier datum included in each communication of the plurality of communication. The associated terminus datum may include any terminus datum as described in the entirety of this disclosure. In an embodiment, for example and without limitation, the associated terminus can include the final destination, wherein the final destination is the details of a physical location, such as an address, coordinates, a unique identifier correlating to a physical location, and/or the like. For example and without limitation, the associated terminus datum may include "Magnum Warehousing 1301 39th Street N Fargo, N. Dak. 58102".

With continued reference to FIG. 4, system 100 can include storing each communication of the plurality of communication received from client device 108 in internal database 112. As described above in further detail, system 100 and/or computing device 104 are configured to communicate with internal database 112. Internal database 112 may be implemented as any database and/or datastore suitable for use as internal database 112 as described in the entirety of this disclosure. An exemplary embodiment of internal database 112 is included above in reference to FIG. 2. Storing may include any means of storing as described in the entirety of this disclosure.

With continued reference to FIG. 4, communication detail 116 generated at computing device 104 may further include an unit quantity datum, an unit detail datum, and a bound datum. The unit quality datum may include any unit detail datum as described in the entirety of this disclosure. The unit quantity datum, in an embodiment, can include any numeric value. For example and without limitation, the unit quantity datum may include a quantity of "10", "64", "190" and the like. In an embodiment, there is no limitation to the number of unit quantity datum included in each communication of the plurality of communication received from client device 108. The unit detail datum may include any unit detail datum as described in the entirety of this disclosure. In an embodiment, without limitation, the unit detail datum may include the technical name of an item, the use of an item, the size of the item, functional location of the item, advertising name for an item, any combination thereof, and/or the like. For example and without limitation, the unit detail datum may include brief descriptions, such as "Bracket, Cab Support", "Bracket, Front Right Bulkhead", "Angle, Platform", "Flange", "323E Track—Z-Lug", "42 in. Mower Blade", to name a few. In an embodiment, the number of unit detail datums included within each communication of the plurality of communication correlated directly to the number of the unit identifier datums included in each communication of the plurality of communications, however there is no limitation as to the quantity of the unit detail datum included in each communication of the plurality of communications. The bound datum may include any bound datum as described in the entirety of this disclosure. In an embodiment, the bound datum can include a date, wherein the date may be arranged in any format utilized for communicating the date. For example and without limitation, the bound datum for a delivery date of Jan. 8, 2020 may include, "01/08/2020", "Jan. 8, 2020", "2020-01-08", "08012020", "01082020", "Jan082020", any combination thereof, and/or the like.

Continuing to refer to FIG. 4, at step 410, system 100 receives a user request from user device 124 by computing device 104. The user request may be further received, in an embodiment, by a content generator 120. The user request may include any user request as described in further detail in the entirety of this disclosure. The user request is configured to include a ready datum. In an embodiment, without limitation, receiving the user request from user device 124 may include the user at user device 124 selecting an icon, entering a textual string of data, selecting a text box, verbally confirming, and the like. For example and without limitation, receiving the user request from user device 124 may include the user at user device 124 selecting a text box labeled "New Transport Request". The ready datum may include any ready datum as described in further detail in the entirety of this disclosure. In an embodiment, the ready datum can include data describing the date the user and/or user device 124 plans to execute transport request 132, where execution is attained when each communication of the plurality of communications is fulfilled by each item of the plurality of items being delivered to the destination location as detailed in the associated terminus data of each communication. In an embodiment, without limitation, receiving the ready datum from user and/or user device 124 may include the user at user device 124 manually entering a date, selecting a date from a calendar display, selecting a date from a drop-down menu, and the like. For example and without limitation, receiving the ready datum from user device 124 may include the user at user device 124 selecting "27" on a calendar display of the month of February in the year 2021.

Still referring to FIG. 4, at step 415, system 100 collects at least an available communication from internal database 112 as a function of the ready datum by computing device 104. The at least an available communication may be collected, in an embodiment, by content generator 120. The available communication may include any available communication as described in the entirety of this disclosure. Internal database 112 can include any internal database 112 as described above in further detail in reference to FIGS. 1-2. The user device 124 may include any user device as described throughout the entirety of this disclosure. Collecting the at least an available communication from internal database 112 can include collecting and/or retrieving each communication of the plurality of communications from internal database 112, wherein each communication of the plurality of communication have yet to be included in transport request 132, as described in further detail above in reference to FIG. 1. For example and without limitation, in an embodiment, collecting the at least an available communication from internal database 112 may include collecting and/or retrieving each communication of the plurality of communications yet to be completed, wherein completion may include transportation to the destination location.

Continuing to refer to FIG. 4, at step 420, system 100 collects a unit identifier from internal database 112 as a function of the first selected communication received from user device 124 by computing device 104. The unit identifier may be, in an embodiment, collected by content generator 120. Collecting the unit identifier from internal database 112 can include collecting and/or retrieving one or more unit identifier associated with the first selected communication from internal database 112, as described above in further detail in reference to FIG. 1. The unit identifier may include any unit identifier as described in further detail in the entirety of this disclosure. Collecting may include any process, method, and/or means of collection and/or retrieval as described in further detail in the entirety of this disclosure. Internal database 112 may include any database and/or datastore as described in further detail in reference to FIG. 2. For example and without limitation, in an embodiment, collecting the unit identifier from internal database 112 may include collecting and/or retrieving the one or more unit identifier included in the first selected communication, wherein the one or more unit identifier was generated utilizing language processing module 116 as described above in further detail.

With continued reference to FIG. 4, at step 425, system 100 configured user device 124, by computing device 104, to generate transport request 132 in display window 136 in a display of user device 124 as a function of the user request. User device 124 may be configured, in an embodiment, utilizing user-side module 128 as described above in further detail in reference to FIG. 1. Display window 136 may include any display window as described above in further detail in reference to FIG. 1. Transport request 132 may include any transport request as described above in further detail in reference to FIG. 1. Transport request 124 may be manually created by user device 124 and/or automatically created utilizing system 100 and/or computing device 104 as described below. For example and without limitation, initiating may include generating transport request 124 with blank fields of information, wherein the fields of information may be automatically input by system 100 and/or computing device 104, and/or manually input by the user on user device 124. The user device 124 may include any user device as described in further detail in the entirety of this disclosure. Display window 136 includes a communication viewing portion displaying a first view of transport request 132. The first view of transport request 132 may include any first view of transport request 132 as described above in further detail in reference to FIG. 1.

Continuing to refer to FIG. 4, display window 136 further includes a first available communication link in the communication viewing portion. Selection and/or activation of the first available communication link creates an associated communication viewing portion within display window 136. Selection and/or activation of the first available communication link causes the associated viewing portion to load a first view of the at least a collected available communication. First available communication link may include any first available communication link as described above in further detail in reference to FIG. 1. Displaying the first view of the at least an available communication to the user device 124 may include any means of display as described in the entirety of this disclosure. In an embodiment, without limitation, displaying the first view of the at least an available communication may include a drop-down menu detailing the at least an available communication, a table detailing the at least an available communication, an icon and/or image detailing the at least an available communication, and the like. For example and without limitation, displaying the first view of the at least an available communication to user device 124 may include a drop-down menu accessed by selecting an empty text field designated for the at least an available communication, wherein the drop-down menu may include a unique identifier associated to a plurality of the at least an available communication, such as "5500186189", "451108006", "4511076734", and "5500202212".

With continued reference to FIG. 4, computing device 104 is configured to receive a first selected communication from user device 124 and the first selected communication is displayed in the first available communication link. The first selected communication may include any first selected communication as described in further detail in the entirety of this disclosure. In an embodiment, the first selected communication can include a communication of the at least an available communication in which the supplier and/or supplier device wants to include in transport request 124. For example and without limitation, receiving the first selected communication from user device 124 may include the user at user device 124 selecting the first selected communication from a drop-down menu of the unique identifier associated to the at least an available communication, such as selecting the unique identifier of "4511076734". Displaying the first selected communication in the first available communication link may include, in a non-limiting embodiment, inserting the first selected communication into a text field designated for the first selected communication, as described above in further detail in reference to FIG. 1. For example and without limitation, displaying the first selected communication in the first available communication link may include inserting the unique identifier associated with the first selected communication in the text field designated for the first selected communication, such as a text field filled with the unique identifier of "4511076734" associated with the first selected communication received from user device 124.

Still referring to FIG. 4, display window 136 of user device 124 further includes a terminus viewing portion. In an embodiment, selection of the first selected communication causes the associated terminus datum to be displayed. The associated terminus datum may include any associated terminus datum as described in the entirety of this disclosure. Displaying may include any means, method and/or process of displaying as described herein. Displaying the associated terminus datum in the terminus viewing portion as a function of the first selected communication can include inserting the terminus datum associated to the first selected communication into a text field designated for the terminus datum, as described in further detail above in reference to FIG. 1. In a non-limiting embodiment, the associated terminus datum may be automatically collected from internal database 112 as a function of the first selected communication by computing device 104 and/or content generator 120. In a further non-limiting embodiment, for example, the associated terminus datum may be manually input in the text field by the user and/or user device 124. For example and without limitation, displaying the terminus datum may include inserting the terminus datum associated with the first selected communication in the text field designated for terminus datum, such that the text field is filled with the terminus datum of "Magnum Warehousing 1301 39th St N Fargo, N. Dak. 58102".

Still referring to FIG. 4, display window 136 further includes a first identifier link in the communication viewing portion. Selection and/or activation of the first identifier link creates an associated identifier viewing portion within display window 136. Selection and/or activation of the first identifier link causes the associated viewing portion to load a first view of the at least a collected unit identifier. First identifier link may include any first identifier link as described above in further detail in reference to FIG. 1. Displaying the first view of the at least a collected unit identifier may include any means of display as described in the entirety of this disclosure. In an embodiment and without limitation, displaying the first view of the at least a collected unit identifier may include a drop-down menu detailing the collected unit identifier, a table detailing the collected unit identifier, an icon and/or image detailing the collected unit identifier, and the like. For example and without limitation, displaying first view of the at least a collected unit identifier may include a drop-down menu accessed by selecting an empty text field designated for the collected unit identifier, wherein the drop-down menu may include the unique identifier of the unit identifier datum, such as "MK22953". The first selected unit identifier may include any first selected unit identifier as described in further detail in the entirety of this disclosure.

With continued reference to FIG. 4, computing device 104 is configured to receive a first selected unit identifier from user device 124 and the first selected unit identifier is displayed in the first identifier link. Receiving the first selected communication from user device 124 may include any means of receiving as described above. Displaying the first selected unit identifier in the first identifier link can include inserting the first selected unit identifier into a text field designated for the unit identifier, wherein the first selected unit identifier is received from user and/or user device 124, as described above in further detail in reference to FIG. 1. In a further non-limiting embodiment, for example, the first selected unit identifier may be manually input in the empty text field designated for the unit identifier by the user and/or user device 124. For example and without limitation, displaying the first selected unit identifier in the first identifier link received from user and/or user device 124 in the text field designated for the unit identifier, such that the text field is filled with the first selected unit identifier of "MK22953".

Continuing to refer to FIG. 4, display window 136 of user device 124 further includes a user submission link in the communication viewing portion. In an embodiment, selection of the user submission link creates a verification viewing portion displaying a verification datum. User submission link may include any user submission link as described above in further detail in reference to FIG. 1. Displaying verification datum in the verification viewing portion can further comprise receiving the user submission datum from user device 124, storing the completed transport request 132 in internal database 112, and transmitting verification datum to user device 124. The user submission datum may include any user submission datum as described in the entirety of this disclosure. In an embodiment, the user submission datum can signify each selected communication of transport request 132 is ready to be transported to the terminus datum. Receiving the user submission from user device 124 may include any means, process, and/or method of receiving as described in the entirety of this disclosure. In an embodiment, without limitation, receiving the user submission from user device 124 may include the user at user device 124 selecting an icon, entering a textual string of data, selecting a text box, verbally confirming, and the like. For example and without limitation, receiving the user submission from user device 124 may include the user at user device 124 selecting a text box labeled "Submit". The completed transport request 124 may include any completed transport request as described in further detail in the entirety of this disclosure. The completed transport request can be stored in internal database 112, as described above in further detail in reference to FIG. 1. For instance and without limitation, the completed transport request 124 may include textual data, such as numerical, character, and/or string data. Internal database 112 may include any internal database 112 as described in further detail above in reference to FIG. 2. The verification datum 132 may include any verification datum 132 as described in the entirety of this disclosure. In an embodiment, the verification datum can include a unique identifier, wherein the unique identifier may include any arrangement alpha-numeric character, as described above in further detail in reference to FIG. 1. In an embodiment and without limitation, the verification datum can be used as a reference to locate the completed transport request 112 within system 100 and/or computing device 104, as described above in further detail. For example and without limitation, the verification datum may include a unique identifier associated to the completed transport request, such as "A100-0038001". Displaying verification datum 132 to the verification viewing portion can include any means of displaying as described in the entirety of this disclosure. In an embodiment and without limitation, displaying verification datum 132 to the verification viewing portion may include a push notification, an email, a textual display, and/or the like. For example and without limitation, displaying verification datum 132 to the verification viewing portion may include a push notification including a textual display of "Confirmation Number: U3800-001".

With continued reference to FIG. 4, computing device 104 and/or content generator 120 may be further configured to collect at least a second available communication as a function of the terminus datum associated to the first selected communication transmitted from user device 124. Collecting the at least a second available communication from the internal database 112 as a function of the terminus datum associated to the first selected communication can include collecting and/or retrieving only the at least a second available communication with a terminus datum equal to the terminus datum of the first selected available communication, such that the terminus datum associated with the at least a second available communication and the terminus datum of the first selected available communication are the same, as described above in further detail in reference to FIG. 1. The at least a second available communication may include any second available communication as described in further detail in the entirety of this disclosure. For example and without limitation, in an embodiment, collecting the at least a second available communication from internal database 112 as a function of the terminus datum associated to the first selected communication may include retrieving the one or more communication of the plurality of communication, wherein the one or more second available communication and the first selected communication share an terminus datum of "Magnum Warehousing 1301 39th St N Fargo, N. Dak. 58102".

Continuing to refer to FIG. 4, generating transport request 132 in display window 136 may further include a second available communication link in the communication viewing portion. Selection and/or activation of the second available communication link creates an associated communication viewing portion within display window 136. Selection and/or activation of the second available communication link causes the associated viewing portion to load a first view of the at least a collected second available communication. Second available communication link may include any second available communication link as described in further detail above in reference to FIG. 1. Displaying the first view of the at least a collected second available communication may include any means of display as described in the entirety of this disclosure. In an embodiment, without limitation, displaying the first view of the at least a collected second available communication may include a drop-down menu detailing the at least a collected available communication as a function of the terminus datum associated to the first selected communication, a table detailing the at least a second collected available communication as a function of the terminus datum associated to the first selected communication, an icon and/or image detailing the at least a second collected available communication as a function of the terminus datum associated to the first selected communication, and the like, as described above in further detail in reference to FIG. 1. For example and without limitation, displaying the first view of the at least a collected second available communication to user device 124 may include a drop-down menu accessed by selecting an empty text field designated for the at least an second selected available communication, wherein the drop-down menu may include a unique identifier associated to a plurality of the at least an available communication, such as "4400186189", "321108006", "3211076734", and "3300202212".

Continuing to refer to FIG. 4, computing device 104 is configured to receive a second selected communication from user device 124 and the second selected communication is displayed in the second available communication link. Receiving the second selected available communication from user device 124 may include any means of receiving as described in the entirety of this disclosure. For example and without limitation, receiving the second selected available communication from user device 124 may include the user at user device 124 selecting the second selected available communication from a drop-down menu of the unique identifier associated to the at least an available communication as a function of the terminus datum associated to the first selected communication, such as selecting the unique identifier of "3276042114". Displaying the second selected available communication in the second available communication link may include, in a non-limiting embodiment, inserting the second selected available communication into a text field designated for the second selected available communication, as described above in further detail in reference to FIG. 1. For example and without limitation, displaying the second selected available communication in the second available communication link may include inserting the unique identifier associated with the second selected available communication in the text field designated for the second selected available communication, such as a text field filled with the unique identifier of "3276042114" associated with the second selected available communication received from user device 124.

Figure 5:
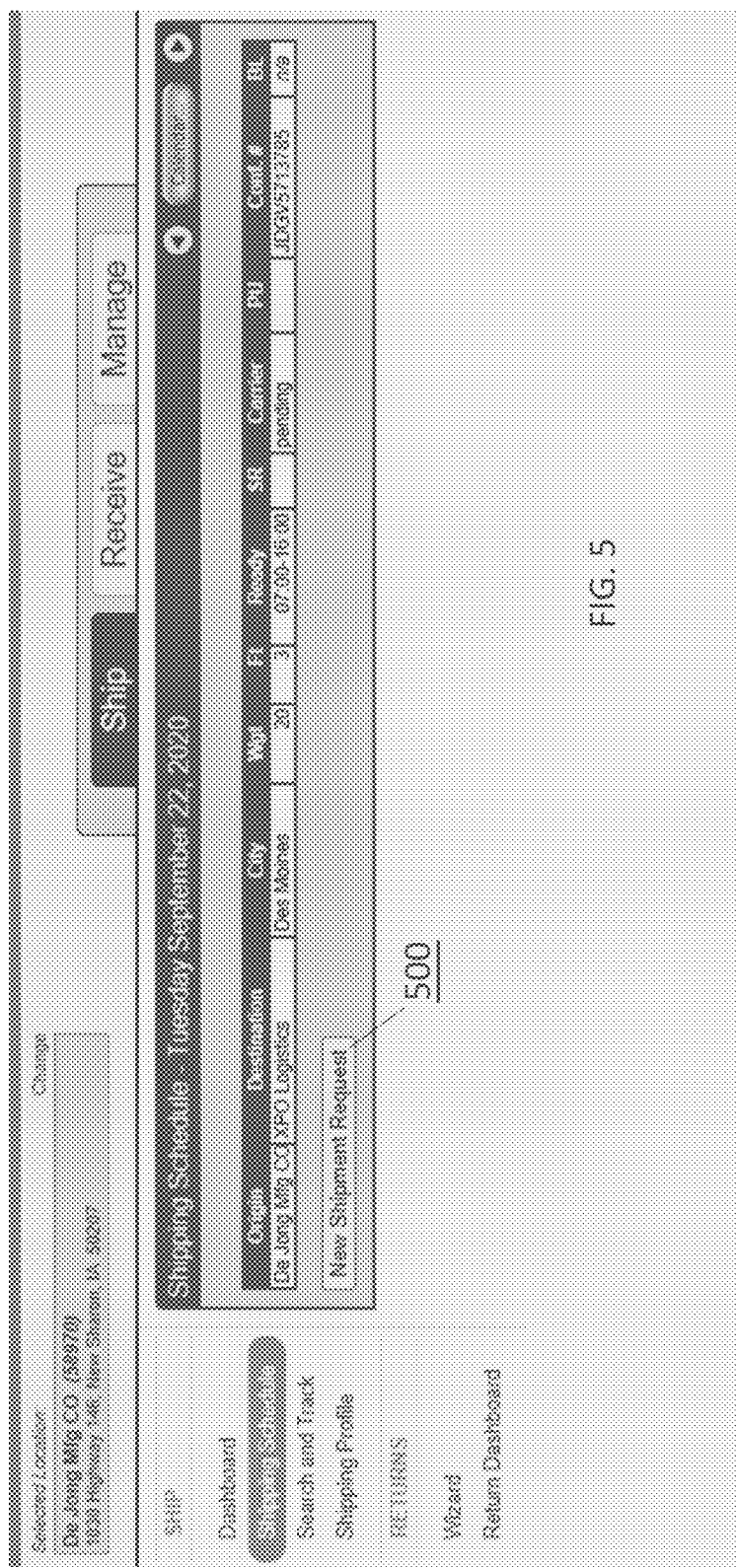
FIG. 5 is a screenshot illustrating an exemplary embodiment of a user request.

Referring now to FIG. 5, an exemplary embodiment of a visual representation of receiving user request 500 from user device 124 is illustrated. User request 500 may be received by content generator 120 and/or computing device 104, as described above in further detail in the entirety of this disclosure. User request 500 may include any user request as described in further detail above in reference to FIGS. 1-4. User device 124 may include any user device as described in the entirety of this disclosure. As described above in further detail, receiving user request 500 can include selecting an icon, entering a textual string of data, selecting a text box, verbally confirming, and the like. In the instant embodiment, receiving user request 500 occurs when the user and/or user device 124 selects user request 500, wherein selecting user request 500 includes interacting with the text box labeled "New Shipment Request". Further, in the instant embodiment, receiving user request 500 from the user and/or user device 124 will initiate transport request 124, as described in further detail in the entirety of this disclosure.

Figure 6:
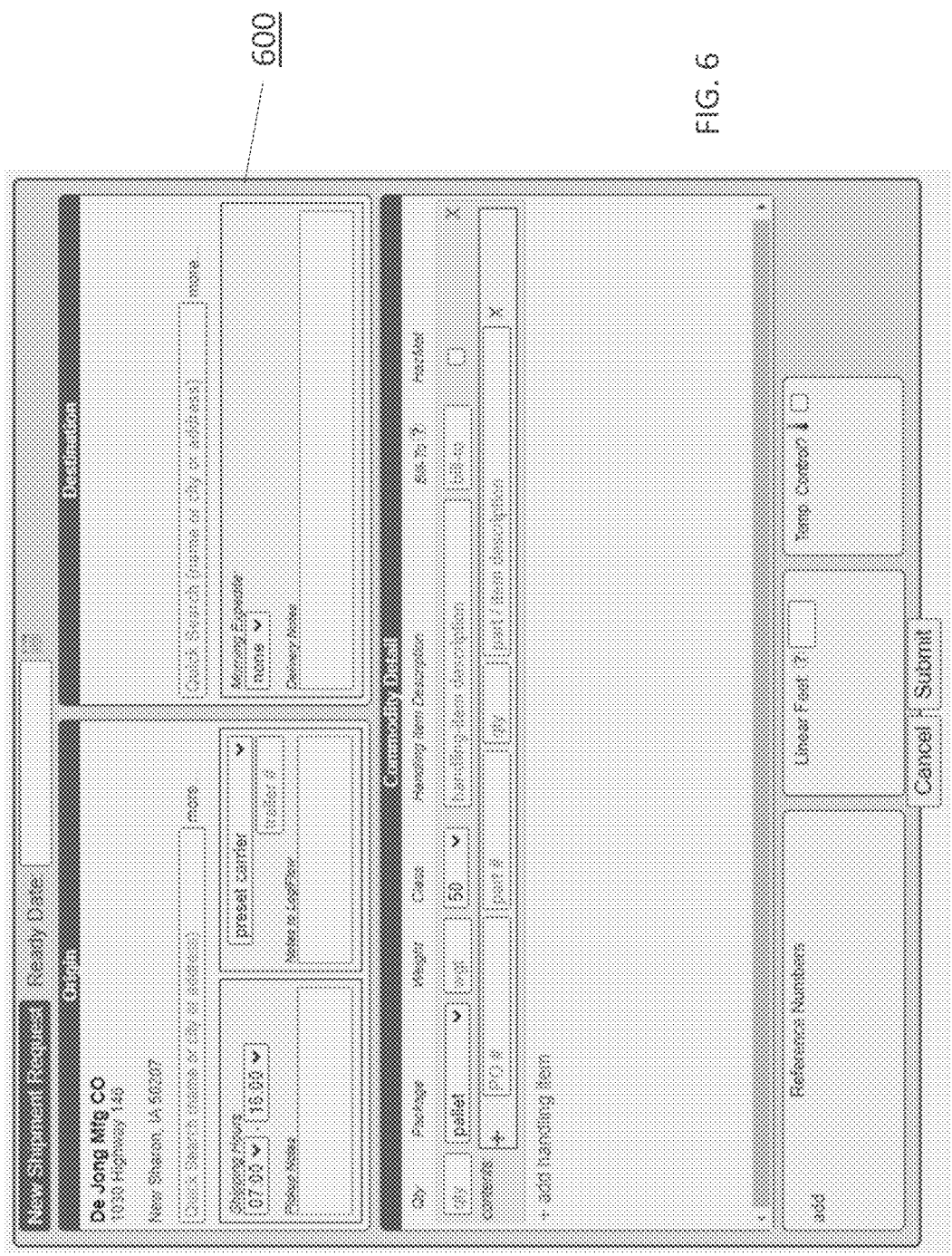
FIG. 6 is a screenshot illustrating an exemplary embodiment of a transport request.

Referring now to FIG. 6, an exemplary embodiment of a visual representation of transport request 600 in display window 136 at a display of user device 124 is illustrated, wherein the first view of transport request 600 is displayed in a first communication viewing portion, as described above in further detail in the entirety of this disclosure. Transport request 600 may include any transport request as described above in further detail in reference to FIGS. 1-4. Transport request 600, in the instant embodiment, is generated, by computing device 104 and/or user-side module 128 as a function of receiving the user request from the user and/or user device 124. The user request may include any user request as described in the entirety of this disclosure. In the instant embodiment, transport request 600 can include a compilation of data, wherein the data may include, without limitation, a first selected unit identifier datum, an associated terminus datum, a first selected communication, an unit quality datum, an unit detail datum, and an allocation code, to name a few. The first selected unit identifier may include any unit identifier as described above in reference to FIGS. 1-4. The associated terminus datum may include any terminus datum as described in the entirety of this disclosure. The first selected communication may include any communication as described herein. The unit detail datum may include any unit detail datum as described above in further detail. The unit quality datum may include any unit quality datum as described above in reference to FIG. 1. The allocation code may include any allocation code as described above in further detail.

Figure 7:
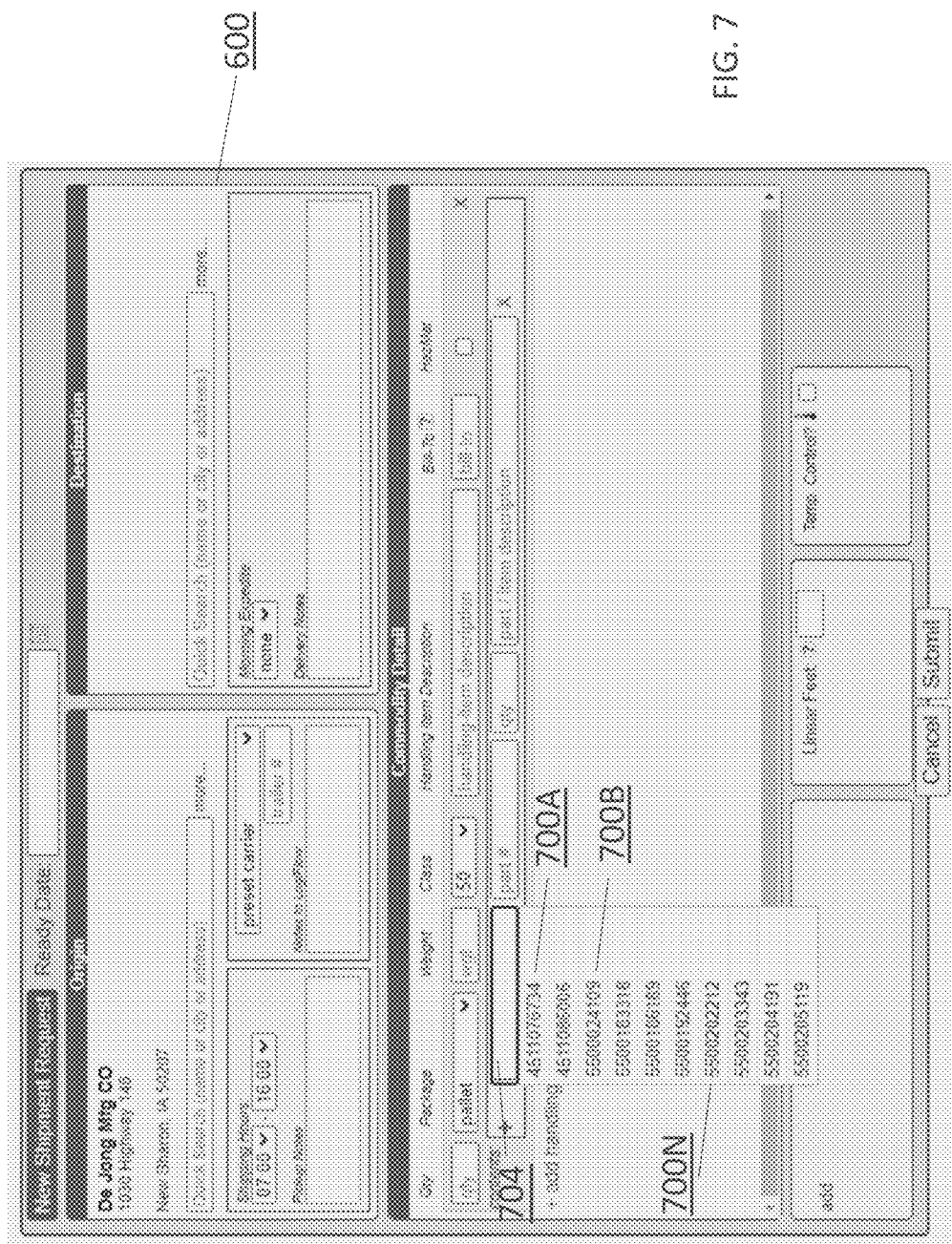
FIG. 7 is a screenshot illustrating an exemplary embodiment of the method of displaying the at least an available communication to a user device.

Referring now to FIG. 7, an exemplary embodiment of displaying the first view of at least a collected available communication 700A-N as a function of selection of the first available communication link 704 of transport request 600 is illustrated. Reference is made to FIG. 6 for context and noting that 600-series numerals correspond to FIG. 6. As shown in FIG. 6, an embodiment of transport request 600 is illustrated, wherein the first view of the at least a collected available communication 700A-N are displayed to the user and/or user device 124 as a function of selection of first available communication link 704 in transport request 600. The at least a collected available communication 700A-N may include any available communication as described above in further detail in reference to FIGS. 1-4. The at least an available communication 700A-N may be retrieved from internal database 100 as a function of the ready datum. The first available communication link 704 may include any first available communication link as described above in further detail in reference to FIGS. 1-4. Displaying the first view of the at least a collected available communication to the user and/or user device 124 may include any means of display as described in the entirety of this disclosure. In an embodiment, without limitation, displaying the at least an available communication may include a drop-down menu detailing the at least an available communication, a table detailing the at least an available communication, an icon and/or image detailing the at least an available communication, and the like, as described above in further detail. In the instant embodiment, displaying the first view of the at least a collected available communication 700A-N includes a drop-down menu detailing a unique identifier associated to the at least an available communication, wherein the drop-down menu is access by selecting an empty text field designated for the first selected available communication.

Figure 8:
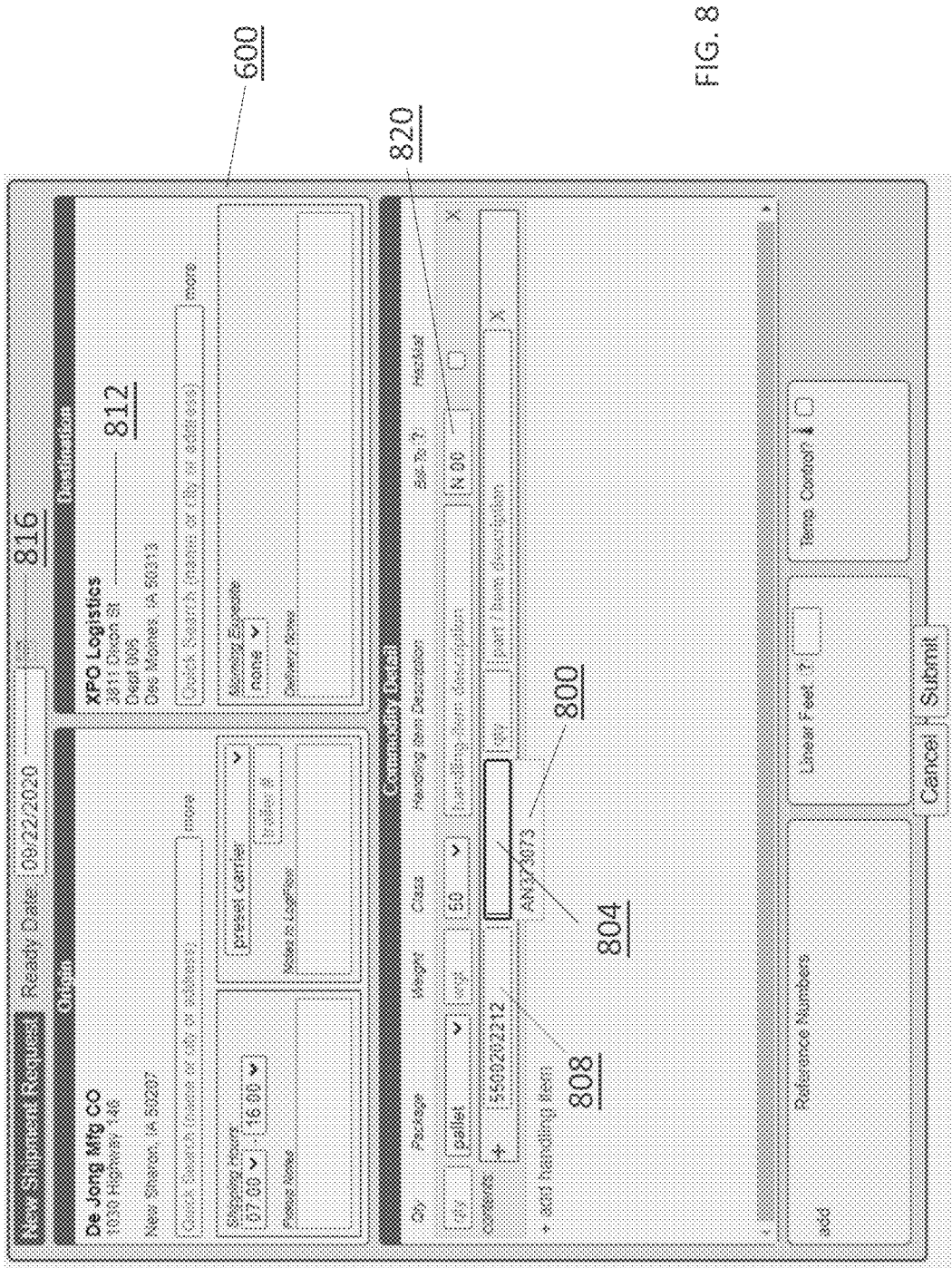
FIG. 8 is a screenshot illustrating an exemplary embodiment of the method of displaying a unit identifier to the user device.

Referring now to FIG. 8, an exemplary embodiment of displaying a first view of the collected unit identifier 800 to the user and/or user device is illustrated. Reference is made to FIG. 6 for context and noting that 600-series numerals correspond to FIG. 6. As shown in FIG. 6, an embodiment of transport request 600 is illustrated, wherein unit identifier 800 is displayed to the user and/or user device 124 within transport request 600. The first view of collected unit identifier 800 is displayed as a function of selection of the first identifier link 804 within transport request 600, as described above I further detail in the entirety of this disclosure. Unit identifier 800 may include any unit identifier as described above in further detail in reference to FIGS. 1-4. Collected unit identifier 800 may include any combination of alpha and/or numerical values, wherein there may be any total of values included in the unit identifier, as described above in further detail. Unit identifier 800 is configured to be associated with an item able to be transmitted from the supplier to a destination, as described above in further detail. The first identifier link of communication viewing portion may include any first identifier link as described above in further detail in reference to FIGS. 1-4. In the instant embodiment, first view of the collected unit identifier 800 displays one collected unit identifier 800 is displayed to the user and/or user device 124, however there is no limit to the number of collected unit identifier 800 displayed to the user and/or user device 800. Displaying unit identifier 800 to the user and/or user device 124 may include any means of display as described in the entirety of this disclosure. In an embodiment, without limitation, displaying unit identifier 800 may include a drop-down menu detailing unit identifier 800, a table detailing unit identifier 800, an icon and/or image detailing unit identifier 800, and the like, as described above in further detail. In the instant embodiment, displaying unit identifier 800 includes a drop-down menu detailing a unique identifier associated to unit identifier 800, wherein the drop-down menu is access by selecting the first identifier link 804, such that the first identifier link 804 is an empty text field designated for the first selected unit identifier.

Continuing to refer to FIG. 8, transport request 600 is configured to include first selected communication 808. First selected communication 804 may include any first selected communication as described in further detail above in reference to FIGS. 1-4. First selected communication 808 is configured to be displayed in transport request 600 as a function of receiving first selected communication 808 from the user and/or user device 124, as described in the entirety of this disclosure. In the instant embodiment, for example and without limitation, first selected communication 808 may include a unique identifier, wherein the unique identifier is "5500202212". In the instant embodiment, transport request 600 is configured to further include terminus datum 812, wherein terminus datum 812 is displayed in a terminus viewing portion transport request 600 as a function of first selected communication 808. Terminus datum 812 may include any terminus datum as described in the entirety of this disclosure. The terminus viewing portion may include any terminus viewing portion as described in the entirety of this disclosure. Displaying terminus datum 812 in the terminus viewing portions of display window 136 of transport request 600 can include any network methodology as described herein. In the instant embodiment, for example and without limitation, terminus datum 812 is associated to first selected available communication 808 and collected from internal database 112, wherein the textual display of terminus datum includes "XPO Logistics 3811 Dixon St Dept 006 Des Moines, Iowa 50313". In the instant embodiment, transport request 600 is configured to further include ready datum 816, wherein ready datum 816 is displayed in a ready viewing portion of transport request 600 as a function of receiving ready datum 816 from the user and/or user device 124. The ready viewing portion may include any ready viewing portion as described in further detail above in the entirety of this disclosure. Ready datum 816 may include any ready datum as described in the entirety of this disclosure. In an embodiment, without limitation, receiving the ready datum from user and/or user device 124 may include the user at user device 124 manually entering a date, selecting a date from a calendar display, selecting a date from a drop-down menu, and the like, as described above in further detail in reference to FIGS. 1-4. In the instant embodiment, for example and without limitation, ready datum 816 is a date selected from a calendar display, wherein the textual display is "09/22/2020". Further, in the instant embodiment, transport request 600 includes allocation code 820, wherein allocation code 816 is collected from internal database 112 as a function of terminus datum 812 and first selected communication 808. Allocation code 820 may include any allocation code as described in further detail above in reference to FIGS. 1-4. Collecting allocation code 820 may include any network methodology of retrieval as described in the entirety of this disclosure. Displaying allocation code 820 in a first allocation link if the communication viewing portion of transport request 600 may include any network methodology as described above in further detail. The first allocation link may include any first allocation link as described in further detail above. In an embodiment without limitation, the allocation code ensures the cost associated with transport request 600 is associated to the proper billing account of the client and/or client device 108, as described above in further detail in reference to FIGS. 1-4. For example and without limitation, in the instant embodiment, allocation code 820 may include an alpha-numeric identifier, wherein the identifier is a textual display of "N 00".

Figure 9:
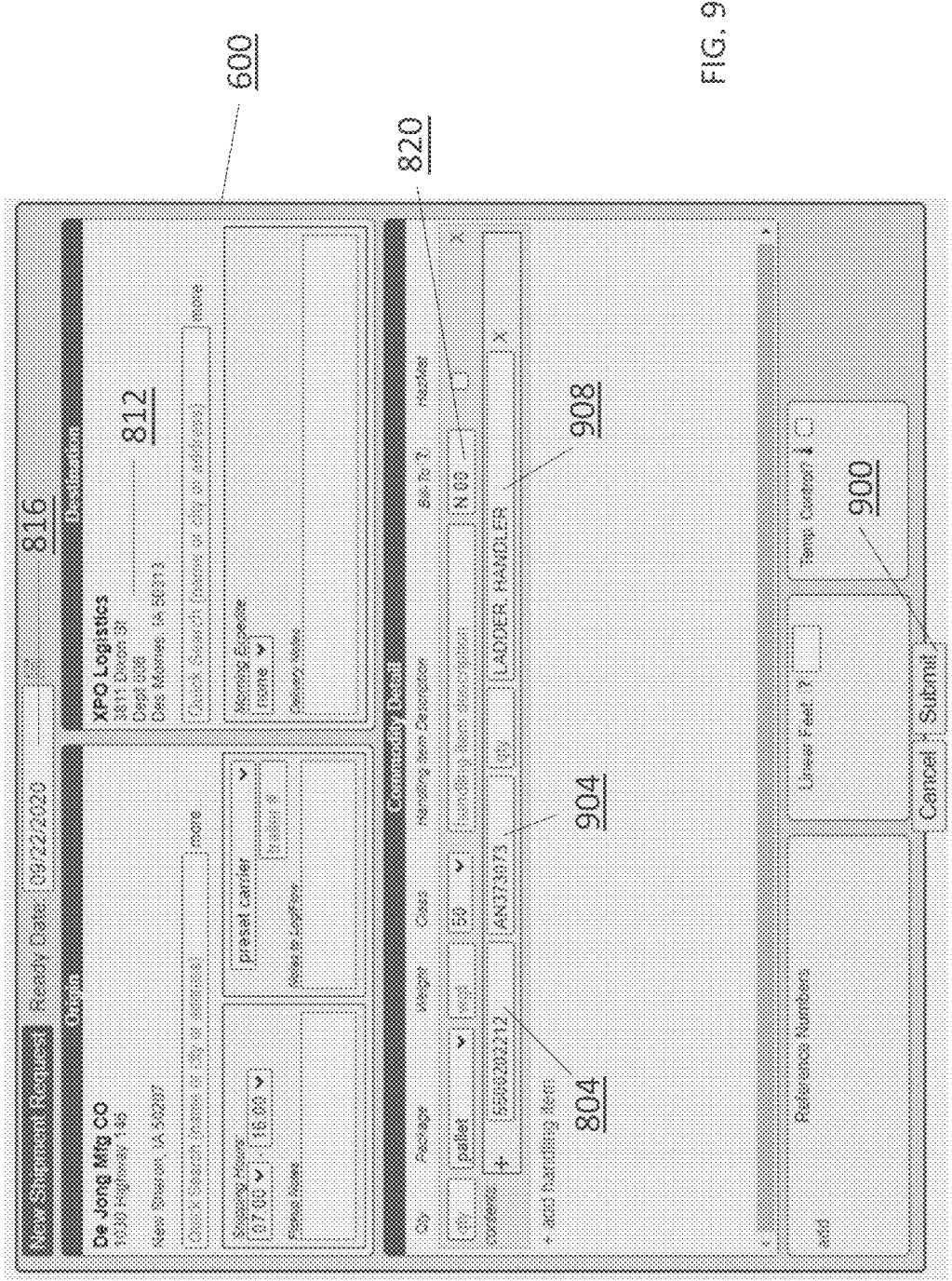
FIG. 9 is a screenshot illustrating an exemplary embodiment of the transport request including a user submission datum.

Referring now to FIG. 9, an exemplary embodiment of user submission link 900 in the communication viewing portion of transport request 600 is illustrated. Reference is made to FIG. 6 for context and noting that 600-series numerals correspond to FIG. 6. As shown in FIG. 6, an embodiment of transport request 600 is illustrated, wherein user submission link 900 is displayed to the user and/or user device 124 within transport request 600. Reference is further made to FIG. 8 for context and noting that 800-series numerals correspond to FIG. 8. User submission link 900 may include any user submission link 900 as described in the entirety of this disclosure. Selection of the user submission link 900 by user device 124 may include any means, process, and/or method of selection as described in the entirety of this disclosure. As described in the entirety of this disclosure, in an embodiment and without limitation, selection of user submission link 900 by user device 124 may include the user at user device 124 selecting an icon, entering a textual string of data, selecting a text box, verbally confirming, and the like. As an example, in the instant embodiment, selection of user submission link 900 by user device 124 may include the user at user device 124 selecting a text box, wherein the text box is labeled "Submit". Further, in an embodiment, the completed transport request 600 and/or a verification datum can be generated as a function of selection of user submission link 900, as described in further detail above in reference to FIGS. 1-4.

With continued reference to FIG. 9, in the embodiment, transport request 600 is configured to further include first selected unit identifier 904, wherein first selected unit identifier 904 displayed in the first unit identifier link in the communication viewing portion of transport request 600 as a function of receiving first selected unit identifier 904 from the user and/or user device 124. The first selected unit identifier 904 may include any first selected unit identifier as described in further detail above in reference to FIGS. 1-4. As described above in further detail, first selected unit identifier 904 can describe the item in which the client and/or client device 108 wants to include in transport request 600. Displaying a first selected unit identifier in transport request 124 can include inserting the first selected unit identifier into the first identifier link, such that the first identifier link is a text field designated for the unit identifier, wherein the first selected unit identifier is received from user and/or user device 124, as described in further detail throughout the entirety of this disclosure. In the instant embodiment, as a non-limiting example, displaying the first selected unit identifier 904 may include inserting the first selected unit identifier received from user and/or user device 124 in the text field designated for the unit identifier, such that the text field is filled with the first selected unit identifier of "AN373073". Transport request 600, in the embodiment, can further include unit detail datum 908, wherein unit detail datum 908 is collected from internal database 112 as a function of first selected unit identifier 904 and displayed in transport request 600. Unit detail datum 908 may include any unit detail datum as described in the entirety of this disclosure. As described above in further detail in reference to FIGS. 1-4, without limitation, the unit detail datum may include the technical name of an item, the use of an item, the size of the item, functional location of the item, advertising name for an item, any combination thereof, and/or the like. In the instant embodiment, as a non-limiting example, unit detail datum 908 can include a textual description of an item associated to first selected unit identifier 904, wherein the textual description is "LADDER, HANDLER".

Figure 10:
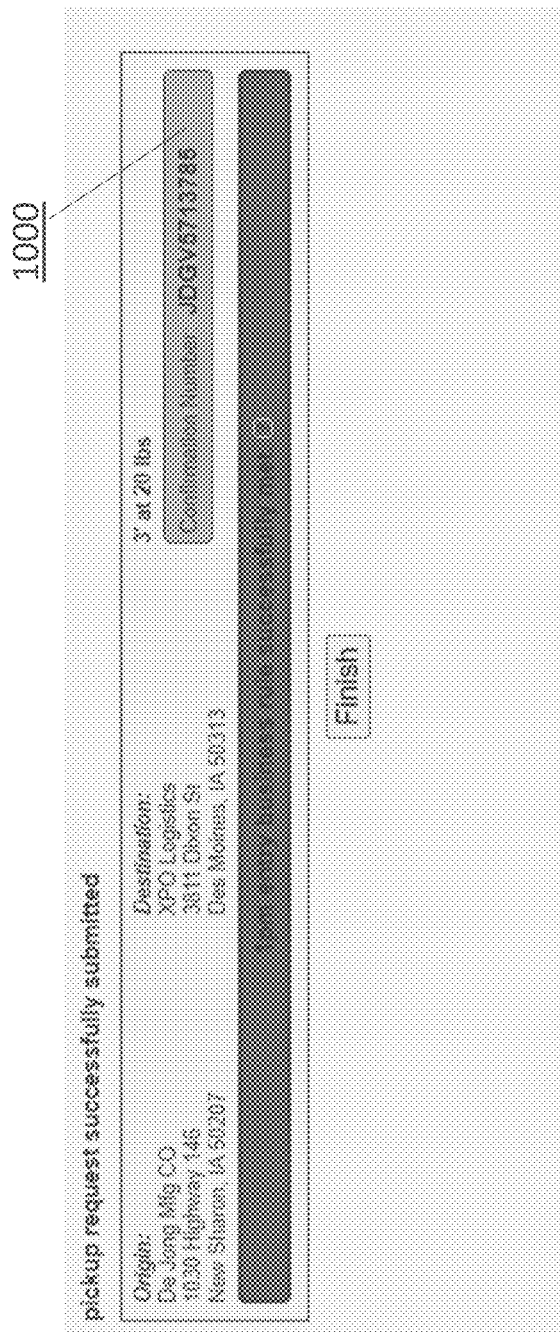
FIG. 10 is a screenshot illustrating an exemplary embodiment of a verification datum.

Referring now to FIG. 10, an exemplary embodiment of displaying verification datum 1000 to the user and/or user device 124 is illustrated. Verification datum 1000 is generated as a function of selection of the user submission link, as described in further detail in the entirety of this disclosure. Verification datum 1000 may include any verification datum as described in further detail above in reference to FIGS. 1-4. As described above in further detail, verification datum 1000 may include a unique identifier, wherein the unique identifier may include any alpha-numeric character in any arrangement. In an embodiment and without limitation, the verification datum can be used as a reference to locate the completes transport request 112 within system 100 and/or computing device 104, as described above in further detail in reference to FIGS. 1-4. Displaying verification datum 1000 to user device 124 can include any means of display as described in the entirety of this disclosure. As described above in further detail, displaying verification datum 100 to user device 132 may include a push notification, an email, a textual display, and/or the like. For example and without limitation, in the instant embodiment display of verification datum 132 may include a push notification including a textual display of "Confirmation Number: JDGV5713785".

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
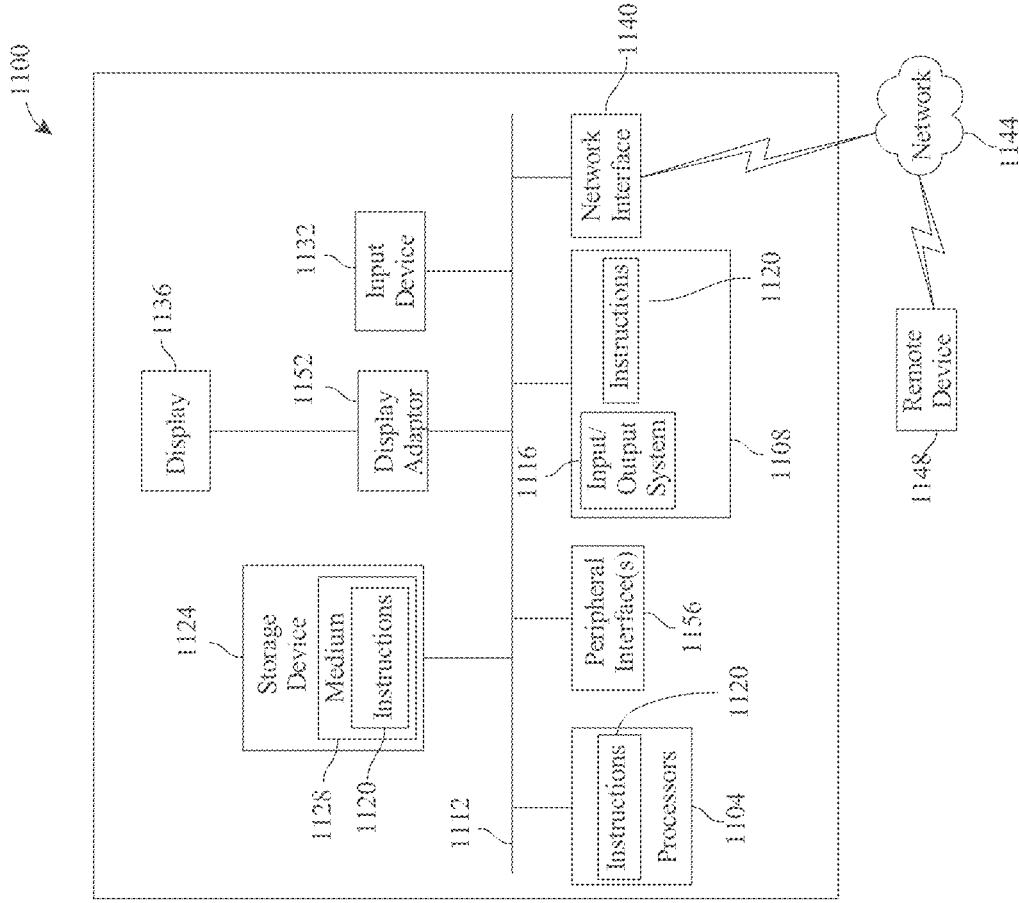
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system, such as the 100 system of FIG. 1, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice user (e.g., a mobile communications user data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for scheduling a user transport, the system comprising:
a computing device comprising hardware and software configured to:
generate a language processing module, wherein the language processing module is configured to extract data from a communication of a plurality of communications received from a client device;
extract, as a function of the language processing module, a communication detail datum from the communication of the plurality of communications received from the client device, wherein the communication detail datum comprises a unit identifier and an associated terminus datum;
generate, as a function of the language processing module, a language processing model configured to determine associations between the extracted communication detail datum and categories of the communication datum, wherein the associations between the extracted communication detail datum and categories of the communication datum comprises a likelihood that the extracted communication detail datum indicates a selected category of the categories of the communication datum;
receive a credential from a user device, wherein the credential comprises a digital certificate;
compare the credential from the user device to an authorized credential stored within an authentication database; and
authenticate the user device based on the comparison between the credential from the user device and the authorized credential;
a content generator operating on the computing device, wherein the content generator comprises executable software that is configured to:
receive a user request from the user device, wherein the user request comprises a ready datum;
collect at least an available communication from an internal database as a function of the ready datum; and
collect a unit identifier from the internal database as a function of a first selected communication received from the user device;
a user-side module operating on the computing device, wherein the user-side module comprises executable software that is configured to:
generate a transport request in a display window at a display of the user device as a function of the user request, wherein the display window includes:
a communication viewing portion displaying a first view of the transport request;
a first available communication link in the communication viewing portion, wherein selection of the first available communication link creates an associated communication viewing portion within the display window and causes the associated communication viewing portion to load a first view of the at least a collected available communication, such that a first selected communication is transmitted to the computing device from the user device and displayed in the first available communication link;
a terminus viewing portion, wherein selection of the first selected communication causes the associated terminus datum to be displayed as a function of a first selected communication;
a first identifier link in the communication viewing portion, wherein selection of the first identifier link creates an associated identifier viewing portion within the transport request and causes the associated identifier viewing portion to load a first view of the collected unit identifier, such that a first selected unit identifier is transmitted to the computing device from the user device and displayed in the first identifier link; and
a user submission link in the communication viewing portion, wherein selection of the user submission link creates a verification viewing portion displaying a verification datum.

2. The system of claim 1, wherein extracting a communication detail datum includes storing each communication of the plurality of communication received from the client device to the internal database.

3. The system of claim 1, wherein the communication detail datum further comprises:
a unit quantity datum;
a unit detail datum; and
a bound datum.

4. The system of claim 3, wherein the content generator is further configured to collect the unit detail datum from the internal database as a function of the first selected unit identifier received from the user device.

5. The system of claim 3, wherein generating the transport request in a display window further includes:
a first unit detail link in the communication viewing portion, wherein selection of the first selected unit identifier causes the collected unit detail datum to be displayed in the first unit detail link.

6. The system of claim 1, wherein the content generator is further configured to collect an allocation code from an internal database as a function of the first selected communication transmitted from the user device.

7. The system of claim 6, wherein generating the transport request in a display window further includes:
   a first allocation link in the communication viewing portion, wherein selection of the first selected communication causes the collected allocation code to be displayed in the first allocation link.

8. The system of claim 1, wherein the content generator is further configured to collect an at least a second available communication from the internal database as a function of the terminus datum associated to the first selected communication transmitted from the user device.

9. The system of claim 8, wherein generating the transport request in a display window further includes:
   a second available communication link in the communication viewing portion, wherein selection of the second available communication link creates an associated communication viewing portion within the transport request and causes the associated communication viewing portion to load a first view of the at least a collected second available communication, such that the second selected communication is transmitted to the computing device from the user device and displayed in the second available communication link.

10. The system of claim 8, wherein the content generator is further configured to collect a second unit identifier as a function of the second selected communication transmitted from the user device.

11. The system of claim 10, wherein generating the transport request in a display window further includes:
   a second identifier link in the communication viewing portion, wherein selection of the second identifier link creates an associated identifier viewing portion within the transport request and causes the associated identifier viewing portion to load a first view of the collected second unit identifier, such that the selected unit identifier is transmitted to the computing device from the user device and displayed in the second identifier link.

12. The system of claim 1, wherein generating the transport request in a display window further includes:
   a ready viewing portion, wherein receiving the ready datum from the user device causes the ready datum to be displayed.

13. The system of claim 1, further comprising storing the verification datum in the internal database, wherein the verification datum includes a completed transport request.

14. The system of claim 1, further comprising a threshold module operating on the computing device, wherein the threshold module comprises executable software that is configured to identify the ready datum and the bound datum are outside a threshold as a function of the user submission datum received from the user device.

15. The system of claim 14, wherein the threshold module is further configured to:
   generate a threshold alert in a display window as a function of the identification of the ready datum and the bound datum outside the threshold, the threshold alert including:
      an alert viewing portion, wherein the alert viewing portion displays a first view of the verification datum.

16. The system of claim 1, further comprising a repeal module, operating on the computing device, wherein the repeal module comprises executable software that is configured to:
   receive a repeal datum from the client device, wherein the repeal datum is associated to a communication of the plurality of communications; and
   terminate the communication of the plurality of communications associated to the repeal datum from the internal database.

17. The system of claim 16, wherein the repeal module is further configured to:
   generate a repeal alert in a display window as a function of the repeal datum, the repeal alert including:
      a repeal viewing portion, wherein the repeal viewing portion displays a first view of the repeal datum.

18. A method of scheduling a user transport, the method comprising:
   extracting, by a language processing module of a computing device, from a plurality of communications received from a client device, a communication detail datum, wherein the communication detail datum comprises a unit identifier and an associated terminus datum;
   determining, by a language processing model of the language processing module, associations between the extracted communication detail datum and categories of the communication datum, wherein the associations between the extracted communication detail datum and categories of the communication datum comprises a likelihood that the extracted communication detail datum indicates a selected category of the categories of the communication datum;
   receiving, by the computing device, a credential from a user device, wherein the credential comprises a digital certificate;
   comparing, by the computing device, the credential from the user device to an authorized credential stored within an authentication database; and
   authenticating, by the computing device, the user device based on the comparison between the credential from the user device and the authorized credential;
   receiving, by the computing device, a user request from the user device, wherein the user request comprises a ready datum;
   collecting, by the computing device, at least an available communication from an internal database as a function of the ready datum;
   collecting, by the computing device, a unit identifier from the internal database as a function of a first selected communication received from the user device; and
   generating, a transport request in a display window at a display of the user device as a function of the user request, wherein the display window includes:
      a communication viewing portion displaying a first view of the transport request;
      a first available communication link in the communication viewing portion, wherein selection of the first available communication link creates an associated communication viewing portion within the display window and causes the associated communication viewing portion to load a first view of the at least an available communication, such that a first selected communication is transmitted to the computing device from the user device and displayed in the first available communication link;

a terminus viewing portion displaying the associated terminus datum as a function of a first selected communication;
a first identifier link in the communication viewing portion, wherein selection of the first available communication link creates an associated identifier viewing portion within the transport request and causes the associated identifier viewing portion to load a first view of the unit identifier, such that a first selected unit identifier is transmitted to the computing device from the user device and displayed in the first identifier link; and
a user submission link in the communication viewing portion, wherein selection of the user submission link creates a verification viewing portion displaying a verification datum.

19. The method of claim 18, further comprising:
collecting, by the computing device, an at least a second available communication as a function of the terminus datum associated to the first selected communication transmitted from the user device.

20. The method of claim 19, wherein generating the transport request in a display window further includes:
a second available communication link in the communication viewing portion, wherein selection of the second available communication link creates an associated communication viewing portion within the transport request and causes the associated communication viewing portion to load a first view of the at least a collected second available communication, such that the second selected communication is transmitted to the computing device from the user device and displayed in the second available communication link.

* * * * *